United States Patent
Senecal et al.

(10) Patent No.: US 11,447,584 B2
(45) Date of Patent: Sep. 20, 2022

(54) OLEFIN POLYMERIZATION ACTIVATORS

(71) Applicant: Dow Global Technologies LLC, Midland, MI (US)

(72) Inventors: Todd D. Senecal, Midland, MI (US); Sukrit Mukhopadhyay, Midland, MI (US); Richard J. Keaton, Lake Jackson, TX (US); Jerzy Klosin, Midland, MI (US); Rafael Huacuja, Lake Jackson, TX (US); David M. Pearson, Lake Jackson, TX (US); William H. H. Woodward, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 38 days.

(21) Appl. No.: 17/043,483

(22) PCT Filed: Mar. 26, 2019

(86) PCT No.: PCT/US2019/024075
§ 371 (c)(1),
(2) Date: Sep. 29, 2020

(87) PCT Pub. No.: WO2019/191098
PCT Pub. Date: Oct. 3, 2019

(65) Prior Publication Data
US 2021/0054119 A1 Feb. 25, 2021

Related U.S. Application Data

(60) Provisional application No. 62/650,453, filed on Mar. 30, 2018.

(51) Int. Cl.
| | | |
|---|---|---|
| C08F 4/642 | (2006.01) | |
| C08F 210/16 | (2006.01) | |
| C08F 210/02 | (2006.01) | |
| C08F 4/64 | (2006.01) | |
| C08F 4/643 | (2006.01) | |
| C08F 4/659 | (2006.01) | |
| C08F 210/04 | (2006.01) | |
| C08F 210/14 | (2006.01) | |

(52) U.S. Cl.
CPC ............ *C08F 210/02* (2013.01); *C08F 4/642* (2013.01); *C08F 4/6437* (2013.01); *C08F 4/64193* (2013.01); *C08F 4/65912* (2013.01); *C08F 210/04* (2013.01); *C08F 210/14* (2013.01); *C08F 210/16* (2013.01)

(58) Field of Classification Search
CPC ........... C08F 4/64; C08F 210/16; C08F 4/642
See application file for complete search history.

(56) References Cited

U.S. PATENT DOCUMENTS

| | | |
|---|---|---|
| 3,773,733 A | 11/1973 | Matsushima |
| 3,860,622 A | 1/1975 | Wade |
| 4,677,088 A | 6/1987 | Huff et al. |
| 5,347,024 A | 9/1994 | Nickias et al. |
| 5,447,895 A | 9/1995 | Marks et al. |
| 5,536,797 A | 7/1996 | Nickias et al. |
| 5,763,549 A | 6/1998 | Elder et al. |
| 5,807,939 A | 9/1998 | Elder et al. |
| 5,919,983 A | 7/1999 | Rosen et al. |
| 6,177,376 B1 | 1/2001 | Fritze et al. |
| 6,221,941 B1 | 4/2001 | Strauss et al. |
| 6,284,697 B1 | 9/2001 | Windisch et al. |
| 6,392,076 B1 | 5/2002 | Strauss et al. |
| 6,395,671 B2 | 5/2002 | LaPointe |
| 6,455,650 B1 | 9/2002 | Lipian et al. |
| 6,462,156 B2 | 10/2002 | LaPointe |
| 6,627,573 B2 | 9/2003 | Babb et al. |
| 6,777,509 B2 | 8/2004 | Brown et al. |
| 6,869,904 B2 | 3/2005 | Boussie et al. |
| 6,900,321 B2 | 5/2005 | Boussie et al. |
| 6,953,764 B2 | 10/2005 | Frazier et al. |
| 7,078,546 B2 | 7/2006 | Piers et al. |
| 7,511,104 B2 | 3/2009 | Pehlert et al. |
| 7,579,416 B2 | 8/2009 | Mihan |
| 7,619,047 B2 | 11/2009 | Yang et al. |
| 7,650,930 B2 | 1/2010 | Cheluget et al. |
| 7,683,194 B2 | 3/2010 | Krossing et al. |
| 8,372,927 B2 | 2/2013 | Figueroa et al. |
| 9,243,090 B2 | 1/2016 | Arriola et al. |
| 9,349,895 B2 | 5/2016 | Ikenaga et al. |
| 9,362,436 B2 | 6/2016 | Nanjundiah et al. |

(Continued)

FOREIGN PATENT DOCUMENTS

| | | |
|---|---|---|
| CN | 102451758 A | 5/2012 |
| EP | 707014 A1 | 4/1996 |
| EP | 824112 A1 | 2/1998 |
| EP | 856523 A1 | 8/1998 |
| EP | 573403 B1 | 11/1998 |

(Continued)

OTHER PUBLICATIONS

U.S Office Action dated Aug. 11, 2021 pertaining to U.S. Appl. No. 17/043,304, filed Sep. 29, 2020, 29 pages.

(Continued)

*Primary Examiner* — Caixia Lu
(74) *Attorney, Agent, or Firm* — Dinsmore & Shohl LLP

(57) ABSTRACT

Embodiments of this disclosure include processes of polymerizing olefins, the process comprising contacting ethylene and a $(C_3-C_{40})$alpha-olefin comonomer in the presence of a catalyst system, the catalyst system comprising a Group IV metal-ligand complex and a metallic activator ionic complex, the metallic activator ionic complex comprising an anion and a countercation, the anion having a structure according to formula (I):

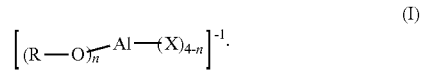

15 Claims, No Drawings

(56) References Cited

U.S. PATENT DOCUMENTS

| | | |
|---|---|---|
| 2004/0162215 A1 | 8/2004 | Vogel |
| 2007/0149386 A1 | 6/2007 | Mihan |
| 2008/0249264 A1 | 10/2008 | Hanefeld et al. |
| 2008/0275189 A1 | 11/2008 | Carnahan et al. |
| 2008/0311812 A1 | 12/2008 | Arriola et al. |
| 2009/0209713 A1 | 8/2009 | McGuiness et al. |
| 2015/0094433 A1 | 4/2015 | Hoang et al. |
| 2015/0094434 A1 | 4/2015 | Tohi et al. |
| 2015/0099856 A1 | 4/2015 | Hoang et al. |
| 2019/0040086 A1 | 2/2019 | Holub et al. |

FOREIGN PATENT DOCUMENTS

| | | |
|---|---|---|
| EP | 1056752 A1 | 12/2000 |
| EP | 1074555 A2 | 2/2001 |
| EP | 1308449 A2 | 5/2003 |
| EP | 2221328 A2 | 8/2010 |
| EP | 2468758 A2 | 6/2012 |
| FR | 2942230 A1 | 8/2010 |
| WO | 9735893 A1 | 10/1997 |
| WO | 9849212 A1 | 11/1998 |
| WO | 9906413 A1 | 2/1999 |
| WO | 9941294 A1 | 8/1999 |
| WO | 0053611 A1 | 9/2000 |
| WO | 0063262 A2 | 10/2000 |
| WO | 0123442 A1 | 4/2001 |
| WO | 0130785 A1 | 5/2001 |
| WO | 0158969 A1 | 8/2001 |
| WO | 03101936 A1 | 12/2003 |
| WO | 2005054254 A1 | 6/2005 |
| WO | 2005063829 A1 | 7/2005 |
| WO | 2007136494 A2 | 11/2007 |
| WO | 2007136496 A2 | 11/2007 |
| WO | 2008038173 A2 | 4/2008 |
| WO | 2010022228 A2 | 2/2010 |
| WO | 2010139684 A1 | 12/2010 |
| WO | 2011102989 A1 | 8/2011 |
| WO | 2014209927 A1 | 12/2014 |
| WO | 2017173080 A1 | 10/2017 |

OTHER PUBLICATIONS

Arriola et al., "Catalytic Production of Olefin Block Copolymers via Chain Shuttling Polymerization", Science, 2006, 312, 714-719.
Busico, V., "Metal-catalysed olefin polymerisation into the new millennium: a perspective outlook", Dalton Transactions 2009, 8794-8802.
Delferro et al., "Multinuclear Olefin Polymerization Catalysts", Chem. Rev. 2011, 111, 2450-2485.
Ewen, J.A., "Propylene Polymerizations with Metallocene/Teal/Trityl Tetrakis (Pentafluorophenyl) Aluminate Mixtures", Catalyst Research Corporation, Houston, Texas, pp. 405-410.
Galland et al., "13C NMR Determination of the Composition of Linear Low-Density Polyethylene Obtained with [è3-Methallyl-nickel-diimine]PF6 Complex", Macromolecules 1999, 32, 1620-1625.
Gao et al., "Highly Soluble Bis-(Alkyl Substituted Carbenium) Bis-borate as Binuclear Cocatalysts for Olefin Polymerizations", Department of Chemistry, Northwestern University, pp. 1-4.
Gao et al., "Supporting Information for Highly Soluble Bis-(Alkyl Substituted Carbenium) Bis-borate as Binuclear Cocatalysts for Olefin Polymerizations", Department of Chemistry, Northwestern University, S1-S26.
International Search Report and Written Opinion pertaining to PCT/US2019/023643, dated Jul. 3, 2019.
International Search Report and Written Opinion pertaining to PCT/US2019/024034, dated Jun. 26, 2019.
International Search Report and Written Opinion pertaining to PCT/US2019/024075, dated Jun. 26, 2019.
International Search Report and Written Opinion pertaining to PCT/US2019/024599, dated Jul. 10, 2019.
International Search Report and Written Opinion pertaining to PCT/US2019/024754, dated Jul. 30, 2019.
Jung et al., "Analysis of Chain Branch of Polyolefins by a New Proton NMR Approach", Anal. Chem. 2016, 88, 1516-1520.
Klosin et al., "Development of Group IV Molecular Catalysts for High Temperature Ethylene-α-Olefin Copolymerization Reactions", Acc. Chem. Res. 2015, 48, 2004-2016.
Kraft et al., "Synthesis and Application of Strong Brønsted Acids Generated from the Lewis Acid Al(ORF)3 and an Alcohol", Organometallics 2012, 31 (21), 7485-7491.
Krossing, I., "The Facile Preparation of Weakly Coordinating Anions: Structure and Characterisation of Silverpolyfluoroalkoxyaluminates AgAl(ORF)4, Calculation of the Alkoxide Ion Affinity", Chem. Eur. J. 2001, 7, 490.
Krossing, I., "Chemistry with Weakly-Coordinating Fluorinated Alkoxyaluminate Anions: Gas Phase Cations in Condensed Phases?", Coord. Chem. Rev., 2006, 250, 2721-2744.
LaPointe et al., "New Family of Weakly Coordinating Anions", J. Am. Chem. Soc., 2000, 122, 9560-9561.
Li et al., "Coordination Copolymerization of Severely Encumbered Isoalkenes with Ethylene: Enhanced Enchainment Mediated by Binuclear Catalysts and Cocatalysts", J. Am. Chem. Soc. 2005, 127, 14756-14768.
Li et al., "Nuclearity and cooperativity effects in binuclear catalysts and cocatalysts for olefin polymerization", Proc. Natl. Acad. Sci. U. S. A. 2006, 103, 15295-15302.
Li et al., "Catalyst/Cocatalyst Nuclearity Effects in Single-Site Polymerization. Enhanced Polyethylene Branching and r-Olefin Comonomer Enchainment in Polymerizations Mediated by Binuclear Catalysts and Cocatalysts via a New Enchainment Pathway", J. Am. Chem. Soc. 2002, 124, 12725-12741.
Makio et al., "FI Catalysts for Olefin Polymerization—A Comprehensive Treatment", Chem. Rev. 2011, 111, 2363-2449.
McGuinness et al., "Cocatalyst Influence in Selective Oligomerization: Effect on Activity, Catalyst Stability, and 1-Hexene/1-Octene Selectivity in the Ethylene Trimerization and Tetramerization Reaction", Organometallics 2007, 26 (10), 2561-2569.
McInnis et al., "Multinuclear Group 4 Catalysis: Olefin Polymerization Pathways Modified by Strong Metal-Metal Cooperative Effects", Acc. Chem. Res. 2014, 47, 2545-2557.
Pangborn et al., "Safe and Convenient Procedure for Solvent Purification", Organometallics 1996, 15 (5), 1518-1520.
Nakazawa et al., "A Synthetic Two-Spin Quantum Bit: g-Engineered Exchange-Coupled Biradical Designed for Controlled-NOT Gate Operations", Angew. Chem., Int. Ed. 2012, 51, 9860-9864.
Strauss et al., "Relative Lewis Basicities of Six Al(ORF)4ÿ Superweak Anions and the Structures of LiAl{OCH(CF3)2}4 and [1-Et-3-Me-1,3-C3H3N2]-[Li{Al{OCH(CF3)2}4}2]", Chem. Eur. J. 2001, 7, 503.
Strauss et al, "LiAl(OC(Ph)(CF3)2)4: A Hydrocarbon-Soluble Catalyst for Carbon-Carbon Bond-Forming Reactions", Organometallics 1996, 15, 3776.
Sturzel et al., "From Multisite Polymerization Catalysis to Sustainable Materials and All-Polyolefin Composites", Chem. Rev. 2016, 116, 1398-1433.
Sun et al., "Al-, Nb- and Ta-based Perfluoroaryloxide Anions as Cocatalysts for Metallocene-Mediated Ziegler-Natta Olefin Polymerization", Organometallics, 2000, 1625-1627.
Yano et al., "Influence of activators on ethylene polymerization with -diphenylmethylidene-cyclopentadienyl/-fluorenyl/zirconium dichloride catalysts at high temperature", J. Mol. Catal. A: Chem. 1999, 148, 77.
International Search Report and Written Opinion dated Sep. 13, 2021 pertaining to International application No. PCT/US2021/031233 filed May 7, 2021, 11 pages.
U.S. Notice of Allowance and Fee(s) Due dated Apr. 26, 2022 pertaining to U.S. Appl. No. 17/043,304, dated Sep. 29, 2020, pp. 1-13.
Krossing, Ingo et al. "New reagents to introduce weakly coordinating anions of type Al(ORF)4-: synthesis, structure and characterization of Cs and trityl salts" Journal of Fluorine Chemistry, 2001, pp. 83-90, 112, Elsevier Science B.V.

(56) References Cited

OTHER PUBLICATIONS

Metz, Matthew V. et al. "Weakly Coordinating Al-, Nb-, Ta-, Y-, and La-Based Perfluoroaryloxymetalate Anions as Cocatalyst Components for Single-Site Olefin Polymerization" Organometallics, 2002, pp. 3691-3702, 21.

OLEFIN POLYMERIZATION ACTIVATORS

CROSS-REFERENCE TO RELATED APPLICATIONS

This application is a National Stage Entry under 35 U.S.C. § 371 of International Patent Application No. PCT/US2019/024075, filed Mar. 26, 2019, which claims priority to U.S. Provisional Patent Application Ser. No. 62/650,453 filed Mar. 30, 2018, both of which are incorporated herein by reference in their entirities.

TECHNICAL FIELD

Embodiments of the present disclosure generally relate to olefin polymerization catalyst systems and processes and, more specifically to olefin polymerization catalyst systems including a Group IV metal-ligand procatalyst complex and a metallic activator, ionic complex activator, or co-catalyst.

BACKGROUND

As part of the catalyst composition in α-olefin polymerization reactions, the activator may have characteristics that are beneficial for the production of the α-olefin polymer and for final polymer compositions including the α-olefin polymer. Activator characteristics that increase the production of α-olefin polymers include, but are not limited to: rapid procatalyst activation, high catalyst efficiency, high temperature capability, consistent polymer composition, and selective deactivation.

Olefin-based polymers such as ethylene-based polymers and propylene based polymers are produced via various catalyst systems. Selection of such catalyst systems can be an important factor contributing to the characteristics and properties of olefin based polymers. The catalyst systems for producing polyethylene-based polymers may include a chromium-based catalyst system, a Ziegler-Natta catalyst system, or a molecular (either metallocene or non-metallocene) catalyst system.

As part of the catalyst system, the molecular polymerization procatalyst is activated to generate the catalytically active species for polymerization, and this can be achieved by any number of means. One such method employs an activator or co-catalyst that is a Brønsted acid. Brønsted acid salts containing weakly coordinating anions are commonly utilized to activate molecular polymerization procatalysts, particularly such procatalysts comprising Group IV metal complexes. Brønsted acid salts that are fully ionized are capable of transferring a proton to form a cationic derivative of such Group IV metal complexes.

For activators such as Brønsted acid salts, the cationic component may include cations capable of transferring a proton such as ammonium, sulfonium, or phosphonium derivatives, for example; or oxidizing cations such as ferrocenium, silver (I), or lead (II) cations, for example; or highly Lewis acidic cations such as carbonium or silylium, for example.

However, once the cations activate the procatalyst, the activators may remain in the polymer composition. As a result, the cations and anions may affect the polymer composition. Since not all ions diffuse equally, different ions affect the polymer composition differently. In particular, the size of the ion, the charge of the ion, the interaction of the ion with the surrounding medium, and the dissociation energy of the ion with available counterions will affect the ion's ability to diffuse through a surrounding medium such as a solvent, a gel, or a polymer material.

Conventional olefin polymerization activators include weakly-coordinating or non-coordinating anions. It has been shown that weak coordination of the anion leads to increased catalytic efficiency of the cationic catalyst. However, since the non-nucleophilic character of the non-coordinating anion also increases diffusion, the residual activator anion in the produced polymer will lower the electrical resistance of the polymer, thereby increasing electrical loss, and thereby decreasing the insulation ability of the produced polymer.

SUMMARY

Desirable characteristics of activators in polymer systems include abilities to increase the production of olefin-based polymers, to increase the rate of procatalyst activation, to increase the overall efficiency of the catalyst, to enable the catalyst system to operate at high temperatures, to enable the catalyst system to provide consistent polymer composition, and to enable decomposition of the activator after olefin polymerization is complete. Activators derived from the non-coordinating anion tetrakis(pentafluorophenyl)borate ($^-B(C_6F_5)_4$) capture many of these desirable characteristics. Nevertheless, under typical polymerization reaction conditions, the $^-B(C_6F_5)_4$ anion fails to decompose readily and may remain intact in the final polymer. The presence of an intact activator in the final polymer can be deleterious to the electrical properties of the final polymer.

Activators based on partially hydrolyzed metal trialkyls, such as methylalumoxane (MAO) or modified methylalumoxane (MMAO), for example, decompose more readily than the $^-B(C_6F_5)_4$ anion, but suffer from poor high-temperature catalyst efficiency and broader compositional drift in the final polymer.

There are ongoing needs for activators that efficiently activate a metal-ligand procatalyst, that are readily broken down, and that perform well at high temperature. The catalyst systems of the present disclosure include, in combination with Group IV metal-ligand complexes, activators, or co-catalysts that address such needs. In particular, the activators readily react with and activate the Group IV metal-ligand procatalyst complexes for the production of polyolefin resins, and the polyolefin resins exhibit useful polymer composition and electrical properties. The activators included in the catalyst systems of this disclosure exhibit characteristics, such as abilities to increase the production of α-olefin polymers, to increase the rate of procatalyst activation, to increase the overall efficiency of the catalyst to enable the catalyst system to operate at high temperatures, to enable the catalyst system to provide consistent polymer composition, and to enable decomposition of the activators.

According to one or more embodiments, processes of polymerizing olefins include contacting ethylene and a ($C_3$-$C_{40}$)α-olefin comonomer in the presence of a catalyst system that includes a Group IV metal-ligand complex and a metallic activator ionic complex. The metallic activator ionic complex includes an anion and a countercation, the anion having a structure according to formula (I):

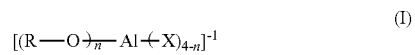

The countercation is any cation having a formal charge of +1. In formula (I), n is 0 or 1. When n is 1, R is selected from the group consisting of radicals having formula (II), radicals having formula (III):

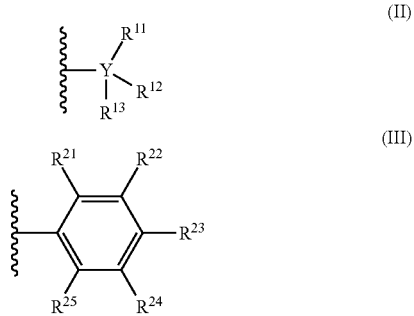

In formulas (II) and (III), each Y is independently carbon or silicon; each instance of $R^{11}$, $R^{12}$, $R^{13}$, $R^{21}$, $R^{22}$, $R^{23}$, $R^{24}$, and $R^{25}$ is independently chosen from $(C_1$-$C_{40})$alkyl, $(C_6$-$C_{40})$aryl, —H, —$OR^C$, —O—, or halogen, wherein $R^C$ is $(C_1$-$C_{30})$hydrocarbyl. When R is a radical according to formula (II), at least one of $R^{11-13}$ is a halogen-substituted $(C_1$-$C_{40})$alkyl, a halogen-substituted $(C_6$-$C_{40})$aryl, or —F; and when R is a radical according to formula (III), at least one of $R^{21-25}$ is a halogen-substituted $(C_1$-$C_{40})$alkyl, a halogen-substituted $(C_6$-$C_{40})$aryl, or —F. In some embodiments, the countercation may be chosen from tertiary carbocations, alkyl-substituted ammonium ions, anilinium, alkyl-substituted alumocenium, or ferrocenium.

In formula (I), each X is a monodentate ligand independently chosen from halogen, halogen-substituted $(C_1$-$C_{20})$ alkyl, $(C_1$-$C_{20})$alkyl, halogen-substituted $(C_6$-$C_{40})$aryl, $(C_6$-$C_{40})$aryl, —$OR^C$, or triflate (-OTf). Moreover, no more than one X is halogen, —$OR^C$, triflate (-OTf), or $(C_1$-$C_{20})$alkyl. Optionally, two R groups in formula (I) are covalently connected. Each $R^C$ is independently $(C_1$-$C_{30})$hydrocarbyl or —H. The metallic activator complex comprises a percent dissipation factor of less than or equal to 0.1 at a concentration of 200 micromoles of metallic activator complex and 20 millimole of water in a hydrocarbon solution as measured by the Hydrocarbon Conductivity Test. In some embodiments, the ratio of total number of moles of the one or more metal-ligand complexes of formula (XI) in the catalyst system to the total number of moles of the one or more co-catalysts in the catalyst system is from 1:10,000 to 100:1.

In one or more embodiments, specifically when two groups X of formula (I) are covalently connected, the co-catalyst has a structure according to formula (IV):

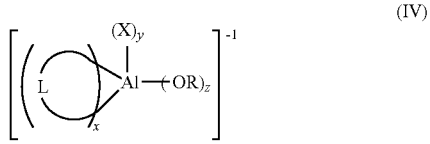

In formula (IV), X and R are as defined in formula (I). The subscript z is 0 or 1; subscript y is 0, 1 or 2; subscript x is 1 or 2; and 2x+y+z=4. Each L, representing the two X groups that are covalently connected, is independently chosen from halogen substituted $(C_2$-$C_{40})$alkylene, halogen substituted $(C_2$-$C_{40})$heteroalkylene, or halogen substituted $(C_6$-$C_{40})$arylene. When subscript z is 1, the monodentate ligand X is chosen from halogen, halogenated-$(C_1$-$C_{20})$ alkyl, $(C_1$-$C_{20})$alkyl, or $S(O)_2CF_3$ (triflate).

DETAILED DESCRIPTION

Specific embodiments of catalyst systems will now be described. It should be understood that the catalyst systems of this disclosure may be embodied in different forms and should not be construed as being limited to the specific embodiments set forth in this disclosure.

Common abbreviations are listed below:

Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; OTf: triflate; $(^tBu^FO)_3Al$: $Al(OC(CF_3)_3)_3$; THF: tetrahydrofuran; $Et_2O$: diethyl ether; $CH_2Cl_2$: dichloromethane; $C_6D_6$: deuterated benzene or benzene-d6: $CDCl_3$: deuterated chloroform; $Na_2SO_4$: sodium sulfate; $MgSO_4$: magnesium sulfate; HCl: hydrogen chloride; n-BuLi: butyllithium; t-BuLi: tert-butyllithium; $K_2CO_3$: potassium carbonate; $Cs_2CO_3$: cesium carbonate; $HfCl_4$: hafnium(IV) chloride; $HfBn_4$: hafnium(IV) tetrabenzyl; $ZrCl_4$: zirconium(IV) chloride; $ZrBn_4$: zirconium(IV) tetrabenzyl; $TiBn_4$: titanium (IV) tetrabenzyl; $N_2$: nitrogen gas; PhMe: toluene; PPR: parallel polymerization reactor; MAO: methylaluminoxane; MMAO: modified methylaluminoxane; NMR: nuclear magnetic resonance; MS: mass spectrometry; mmol: millimoles; mL: milliliters; M: molar; min or mins minutes; h or hrs: hours; d: days.

The term "independently selected" is used herein to indicate that the R groups, such as, $R^1$, $R^2$, $R^3$, $R^4$, and $R^5$, can be identical or different (such that $R^1$, $R^2$, $R^3$, $R^4$, and $R^5$ may all be substituted alkyls or $R^1$ and $R^2$ may be a substituted alkyl and $R^3$ may be an aryl, etc.). A chemical name associated with an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x$-$C_y)$" means that the unsubstituted form of the chemical group has from x carbon atoms to y carbon atoms, inclusive of x and y. For example, a $(C_1$-$C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x$-$C_y)$" parenthetical may contain more than y carbon atoms depending on the identity of any groups $R^S$. For example, a "$(C_1$-$C_{50})$alkyl substituted with exactly one group $R^S$, where $R^S$ is phenyl (—$C_6H_5$)" may contain from 7 to 56 carbon atoms. Thus, in general when a chemical group defined using the "$(C_x$-$C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g., $R^S$). The term "—H" means a hydrogen or hydrogen radical that is covalently bonded to another atom. "Hydrogen" and "—H" are interchangeable, and unless clearly specified have identical meanings.

The term "halogen-substituted" means that at least one hydrogen atom (—H) bonded to a carbon atom or heteroatom of a corresponding unsubstituted compound or functional group is replaced by a halogen. The term "halogen-substituted" and "halogenated" are interchangeable. The term "perhalogenated" means that every —H bonded to a carbon atom or heteroatom of a corresponding unsubstituted compound or functional group is replaced by a halogen. The term "halogen-substituted" means that at least one —H bonded to a carbon atom or heteroatom of a corresponding unsubstituted compound or functional group is replaced by a halogen atom.

In this disclosure, the term "halogen atom" or "halogen" means the radical of a fluorine atom (F) or chlorine atom (Cl). The term "halide" means anionic form of the halogen atom, e.g., fluoride (F$^-$) or chloride (Cl$^-$).

The term "($C_1$-$C_{50}$)hydrocarbyl" means a hydrocarbon radical of from 1 to 50 carbon atoms and the term "($C_1$-$C_{50}$)hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a ($C_1$-$C_{50}$)hydrocarbyl may be an unsubstituted or substituted ($C_1$-$C_{50}$)alkyl, ($C_3$-$C_{50}$)cycloalkyl, ($C_3$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene (such as benzyl (—CH$_2$—$C_6H_5$)).

The terms "($C_1$-$C_{50}$)alkyl" and "($C_1$-$C_{18}$)alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted ($C_1$-$C_{50}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, trifluoromethyl, and [$C_{45}$]alkyl. The term "[$C_{45}$]alkyl" means there is a maximum of 45 carbon atoms in the radical, including substituents, and is, for example, a ($C_{27}$-$C_{40}$)alkyl substituted by one $R^S$, which is a ($C_1$-$C_5$)alkyl, respectively. Each ($C_1$-$C_5$)alkyl may be methyl, trifluoromethyl, ethyl, 1-propyl, 1-methylethyl, or 1,1-dimethylethyl. More broadly, the term "[$C_z$]alkyl" means there is a maximum of z carbon atoms, wherein z is a positive integer, in the radical, including substituents.

The term "($C_6$-$C_{50}$)aryl" means an unsubstituted or substituted (by one or more $R^S$) monocyclic, bicyclic, or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic; hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted ($C_6$-$C_{50}$)aryl include: unsubstituted ($C_6$-$C_{20}$)aryl, unsubstituted ($C_6$-$C_{18}$)aryl; 2-($C_1$-$C_5$)alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted ($C_6$-$C_{40}$)aryl include: substituted ($C_1$-$C_{20}$)aryl; substituted ($C_6$-$C_{18}$)aryl; 2,4-bis([$C_{20}$]alkyl)-phenyl; polyfluorophenyl; pentafluorophenyl; fluoren-9-one-1-yl; and biphenyl.

The term "($C_3$-$C_{50}$)cycloalkyl" means a saturated cyclic; hydrocarbon radical of from 3 to 50 carbon atoms that is unsubstituted or substituted by one or more $R^S$. Other cycloalkyl groups (e.g., ($C_x$-$C_y$)cycloalkyl) are defined in an analogous manner as having from x to y carbon atoms and being either unsubstituted or substituted with one or more $R^S$. Examples of unsubstituted ($C_3$-$C_{50}$)cycloalkyl are unsubstituted ($C_3$-$C_{20}$)cycloalkyl, unsubstituted ($C_3$-$C_{10}$)cycloalkyl, cyclopropyl, cyclobutyl, cyclopentyl, cyclohexyl, cycloheptyl, cyclooctyl, cyclononyl, and cyclodecyl. Examples of substituted ($C_3$-$C_{40}$)cycloalkyl are substituted ($C_3$-$C_{20}$)cycloalkyl, substituted ($C_3$-$C_{10}$)cycloalkyl, and 1-fluorocyclohexyl.

Examples of ($C_1$-$C_{50}$)hydrocarbylene include unsubstituted or substituted ($C_6$-$C_{50}$)arylene, ($C_3$-$C_{50}$)cycloalkylene, and ($C_1$-$C_{50}$)alkylene (e.g., ($C_1$-$C_{20}$)alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or α,ω-diradicals. The α,ω-diradical is a diradical that has maximum carbon backbone spacing between the radical carbons. Some examples of ($C_2$-$C_{20}$)alkylene α,ω-diradicals include ethan-1,2-diyl (i.e., —CH$_2$CH$_2$—), propan-1,3-diyl (i.e., —CH$_2$CH$_2$CH$_2$—), 2-methylpropan-1,3-diyl (i.e., —CH$_2$CH(CH$_3$)CH$_2$—). Some examples of ($C_6$-$C_{50}$)arylene α,ω-diradicals include phenyl-1,4-diyl, napthalen-2,6-diyl, or napthalen-3,7-diyl.

The term "($C_1$-$C_{50}$)alkylene" means a saturated straight chain or branched chain diradical (i.e., the radicals are not on ring atoms) of from 1 to 50 carbon atoms that is unsubstituted or substituted by one or more $R^S$. Examples of unsubstituted ($C_1$-$C_{50}$)alkylene are unsubstituted ($C_1$-$C_{20}$)alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$), in which "C*" denotes a carbon atom from which a hydrogen atom is removed to form a secondary or tertiary alkyl radical. Examples of substituted ($C_1$-$C_{50}$)alkylene are substituted ($C_1$-$C_{20}$)alkylene, —CF$_2$—, —C(O)—, and —(CH$_2$)$_{14}$C(CH$_3$)$_2$(CH$_2$)$_5$— (i.e., a 6,6-dimethyl substituted normal-1,20-eicosylene). Since as mentioned previously two $R^S$ may be taken together to form a ($C_1$-$C_{18}$) alkylene, examples of substituted ($C_1$-$C_{50}$)alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis(methylene)bicyclo [2.2.2] octane.

The term "($C_3$-$C_{50}$)cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include O, S, S(O), S(O)$_2$, Si(R$^C$)$_2$, P(R$^P$), Ge(R$^C$)$_2$, N(R$^N$), or —N═C(R$^C$)$_2$, where each R$^C$ and each R$^P$ is unsubstituted ($C_1$-$C_{18}$)hydrocarbyl or —H, and where each R$^N$ is unsubstituted ($C_1$-$C_{18}$)hydrocarbyl. The term "heterohydrocarbon" refers to a molecule or molecular framework in which one or more carbon atoms of a hydrocarbon are replaced with a heteroatom. The term "($C_1$-$C_{50}$)heterohydrocarbyl." means a heterohydrocarbon radical of from 1 to 50 carbon atoms, and the term "($C_1$-$C_{50}$)heterohydrocarbylene" means a heterohydrocarbon diradical of from 1 to 50 carbon atoms. The heterohydrocarbon of the ($C_1$-$C_{50}$)heterohydrocarbyl or the ($C_1$-$C_{50}$) heterohydrocarbylene has one or more heteroatoms. The radical of the heterohydrocarbyl may be on a carbon atom or a heteroatom. The two radicals of the heterohydrocarbylene may be on a single carbon atom or on a single heteroatom, one of the two radicals of the diradical may be on a carbon atom and the other radical may be on a different carbon atom; one of the two radicals may be on a carbon atom and the other on a heteroatom; or one of the two radicals may be on a heteroatom and the other radical may be on a different heteroatom. Each ($C_1$-$C_{50}$)heterohydrocarbyl and ($C_1$-$C_{50}$) heterohydrocarbylene may, be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The ($C_1$-$C_{50}$)heterohydrocarbyl may be unsubstituted or substituted. Non-limiting examples of the ($C_1$-$C_{50}$)heterohydrocarbyl include ($C_1$-$C_{50}$)heteroalkyl, ($C_1$-$C_{50}$)hydrocarbyl-O—, ($C_1$-$C_{50}$)hydrocarbyl-S—, ($C_1$-$C_{50}$)hydrocarbyl-S(O)—, ($C_1$-$C_{50}$)hydrocarbyl-S(O)$_2$—, ($C_1$-$C_{50}$)hydrocarbyl-Si($R^C$)$_2$—, ($C_1$-$C_{50}$)hydrocarbyl-N($R^N$)—, ($C_1$-$C_{50}$) hydrocarbyl-P($R^P$)—, ($C_2$-$C_{50}$)heterocloalkyl, ($C_2$-$C_{19}$) heterocycloalkyl-($C_1$-$C_{20}$)alkylene, ($C_2$-$C_{20}$)cycloalkyl-($C_1$-$C_{19}$)heteroalkylene, ($C_2$-$C_{19}$)heterocycloalkyl-($C_1$-$C_{20}$) heteroalkylene, ($C_1$-$C_{50}$)heteroaryl, ($C_1$-$C_{19}$)heteroaryl-($C_1$-$C_{20}$)alkylene, ($C_6$-$C_{20}$)aryl-($C_1$-$C_{19}$)heteroalkylene, or ($C_1$-$C_{19}$)heteroaryl-($C_1$-$C_{20}$)heteroalkylene.

The term "($C_4$-$C_{50}$)heteroaryl" means an unsubstituted or substituted (by one or more $R^S$) monocyclic, bicyclic, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently, fused or non-fused and aromatic or non-aromatic. Other heteroaryl groups (e.g., ($C_x$-$C_y$)heteroaryl generally, such as ($C_4$-$C_{12}$)heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring.

The 5-membered ring monocyclic heteroaromatic hydrocarbon radical has 5 minus h carbon atoms, where h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl.

The 6-membered ring monocyclic heteroaromatic hydrocarbon radical has 6 minus h carbon atoms, where h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl.

The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

The term "($C_1$-$C_{50}$)heteroalkyl" means a saturated straight or branched chain radical containing one to fifty carbon atoms, and one or more heteroatom. The term "($C_1$-$C_{50}$)heteroalkylene" means a saturated straight or branched chain diradical containing from 1 to 50 carbon atoms and one or more than one heteroatom. The heteroatoms of the heteroalkyls or the heteroalkylenes may include Si($R^C$)$_3$, Ge($R^C$)$_3$, Si($R^C$)$_2$, Ge($R^C$)$_2$, P($R^P$)$_2$, P($R^P$), N($R^N$)$_2$, N($R^N$), N, O, O$R^C$, S, S$R^C$, S(O), and S(O)$_2$, wherein each of the heteroalkyl and heteroalkylene groups are unsubstituted or are substituted by one or more $R^S$.

Examples of unsubstituted ($C_2$-$C_{40}$)heterocycloalkyl include unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2 yl, hexahydroazepin-4-yl, 3-oxa-cyclooctyl, 5-thio-cyclononyl, and 2-aza-cyclodecyl.

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorus double bonds, or carbon-silicon double bonds, not including double bonds that may be present in substituents $R^S$, if any, or in aromatic rings or heteroaromatic rings, if any.

Embodiments of this disclosure include processes for polymerizing olefins, the process comprising contacting ethylene and a ($C_3$-$C_{40}$)alpha-olefin comonomer in the presence of a catalyst system that includes a Group IV metal-ligand complex and a metallic activator ionic complex, the metallic activator ionic complex comprising an anion and a countercation, the anion having a structure according to formula (I):

$$[(\text{R}\!-\!\text{O})_{\overline{n}}\!-\!\text{Al}\!-\!(\text{X})_{4-n}]^{-1} \quad (\text{I})$$

In formula (I), each X is a monodentate ligand independently chosen from halogen, halogen-substituted ($C_1$-$C_{20}$) alkyl, or halogen-substituted ($C_6$-$C_{40}$)aryl. Furthermore, at most, one X is halogen.

In formula (I), subscript n is 0 or 1. Each R is independently selected from the group consisting of radicals having formula (II) and radicals having formula (III):

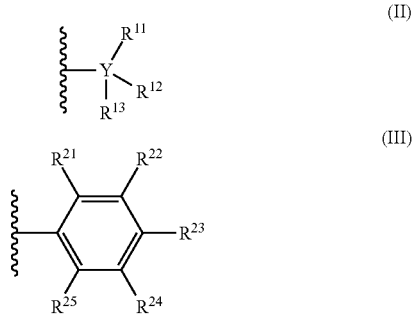

In formula (II), each Y is independently carbon or silicon; and each $R^{11}$, $R^{12}$, $R^{13}$, is independently chosen from $(C_1-C_{40})$alkyl, $(C_6-C_{40})$aryl, —H, $NR^N_2$, $—OR^C$, $—SR^C$, or halogen. In some embodiments of formula (I), when each R is a radical according to formula (II) and Y is carbon, at least one of $R^{11-13}$ is a halogen-substituted $(C_1-C_{40})$alkyl, a halogen-substituted $(C_6-C_{40})$aryl, or —F.

In formula (III), each $R^{21}$, $R^{22}$, $R^{23}$, $R^{24}$, and $R^{25}$ is independently chosen from $(C_1-C_{40})$alkyl, $(C_6-C_{40})$aryl, —H, $—NR^N_2$, $—OR^C$, $—SR^C$, or halogen. When R is a radical according to formula (III), at least one of $R^{21}-R^{25}$ is a halogen-substituted $(C_1-C_{40})$alkyl, a halogen-substituted $(C_6-C_{40})$aryl, or —F.

In one or more embodiments of the catalyst system, in the anion of formula (I), n is 0 and each X group is independently $—C(H)(CF_3)_2$, $—C_6F_5$, or $—C(CF_3)_3$. In some embodiments, one X is chosen from —OH, triflate (-OTf), methyl, or halogen. In other embodiments, n is 0, and three of the four X groups are $—C(CF_3)_3$ and one X of the four X groups is $—C_6F_5$.

In embodiments of polymerization system, when the countercation is $Me_2PhN(H)^+$, and the anion is $Al(C_6F_5)_4$, the procatalyst is not $Ph_2C(Cp)(Flu)ZrCl_2$ or $Et(1-Ind)_2ZrCl_2$. In some embodiments, when the countercation is $(Ph)_3C^+$, and the anion is $Al(C_6F_5)_4$, the procatalyst is not $Et(1-Ind)_2ZrCl_2$.

In one or more embodiments of the catalyst system, in the anion of formula (I), two X groups are covalently connected and the anion has a structure according to formula (IV):

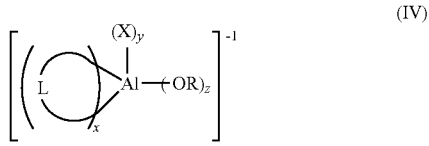

In formula (IV), R and each X are as defined in formula (I); z is 0 or 1; y is 0, 1, or 2; x is 1 or 2; and $2x+y+z=4$. L represents the two X groups that are covalently connected; and L is independently chosen from halogen substituted $(C_2-C_{40})$alkylene, halogen substituted $(C_2-C_{40})$heteroalkylene, or halogen substituted $(C_6-C_{40})$arylene.

In formula (IV), when z is 1, X is chosen from halogenated-$(C_1-C_{20})$alkyl.

In one or more embodiments of the catalyst system including an anion of formula (IV), L is a halogenated biphenyl diradical ion or halogenated naphthalene-diyl. The halogenated biphenyl diradical ion may have a single radical on each of the phenyl rings. The diradicals on the halogenated naphthalene-diyl may be separated by four or more carbon atoms in the naphthalene.

In one or more embodiments, the metallic activator ionic complex includes the anion according to formulas (I) or (IV) and the countercation having a formal charge of positive one (+1). In some embodiments of the metallic ionic complex, the countercation is chosen from a protonated tri[$(C_1-C_{40})$ hydrocarbyl] ammonium cation. In some embodiments, the countercation is a protonated trialkylammonium cation, containing one or two $(C_{14}-C_{20})$alkyl groups on the ammonium cation. In one or more embodiments, the countercation is $^+N(H)R^N_3$, where each $R^N$ is chosen from $(C_1-C_{20})$alkyl or $(C_6-C_{20})$aryl. In one or more embodiments, the countercation is $^+N(H)R^N_3$, where at least two $R^N$ are chosen from $(C_{10}C_{20})$alkyl. In one or more embodiments, the countercation is $^+N(H)R^N_3$, wherein $R^N$ is $(C_{16}C_{18})$alkyl. In one or more embodiments, the countercation is $^+N(CH_3)HR^N_2$, wherein $R^N$ is $(C_{16}C_{18})$alkyl. In some embodiments, the countercation is chosen from methyldi(octadecyl)ammonium cation, methyl(octadecyl)(hexadecyl)ammonium cation, methyldi(hexadecyl)ammonium cation, or methyldi(tetradecyl)ammonium cation. The methyldi(octadecyl) ammonium cation, methyl(octadecyl)(hexadecyl) ammonium cation, methyldi(hexadecyl)ammonium cation, or methyldi(tetradecyl)ammonium cation are collectively referred to herein as armeenium cations. Ionic compounds having armeenium cations are easily formed by protonating (with anhydrous HCl in ether, for example) methyldi(octadecyl)amine, methyl(octadecyl)(hexadecyl)amine, methyldi(hexadecyl)amine, or methyldi(tetradecyl)amine which are available from Akzo-Nobel under the Armeen™ trade names, for example Armeen™ M2HT. In other embodiments, the countercation is triphenylmethyl carbocation ($^+C(C_6H_5)_3$), also referred to as trityl. In one or more embodiments, the countercation is a tris-substituted-triphenylmethyl carbocation, such as $^+C(C_6H_4R^C)_3$, wherein each $R^C$ is independently chosen from $(C_1-C_{30})$alkyl. In other embodiments, the countercation is chosen from anilinium, ferrocenium, or aluminoceniums. Anilinium cations are protonated nitrogen cations, such as $[HN(R^S)(R^N)_2]^+$, where $R^N$ is $(C_1-C_{20})$alkyl or H and $R^S$ is chosen from $(C_6-C_{20})$aryl, and each alkyl or aryl may be further substituted with $—OR^C$, for example $C_6H_5NMe_2H^+$. Aluminoceniums are aluminum cations, such as $R^S_2Al(THF)_2^+$, where $R^S$ is chosen from $(C_1-C_{30})$alkyl.

In one or more embodiments, the metallic activator ionic complex has a dissipation factor of less than or equal to 0.1 at a concentration of 177.6 micromoles of metallic activator complex and 18 millimoles of water in a high boiling point fully saturated hydrocarbon solution as measured by the Hydrocarbon Conductivity Test. In some embodiments, the metallic activator ionic complex has a dissipation factor of less than or equal to 0.05, less than or equal to 0.03, or less than or equal 0.025 at a concentration of 177.6 micromoles of metallic activator ionic complex and 18 millimoles of water per liters of a high boiling point fully saturated hydrocarbon solution as measured by the Hydrocarbon Conductivity Test. The high boiling point fully saturated hydrocarbon solution ("hydrocarbon solution") includes a high boiling point fully saturated hydrocarbon solvent, water, and the metallic activator ionic complex. The high boiling point fully saturated hydrocarbon solvent may include squalane, dodecane, eicosane, or triacontane. The term "high boiling point" in reference to "high boiling point fully saturated hydrocarbon solvent" refers to a solvent having a boiling point greater than or equal to 150 ° C. to 190 ° C.

In order to understand the comparative electrical properties of a polyolefin elastomer produced by a polymerization process according to this disclosure, specifically the elastomer produced by the metallic activator ionic complex according to formula (I) the Hydrocarbon Conductivity (HC) Test was performed. The HC Test simulates difference between the electrical properties of polyolefin elastomers produce by a comparative activator, such as methyldi(($C_{14}$-$C_{20}$)alkyl)ammonium tetrakis(pentafluorophenyl)borate and the metallic activator ionic complexes of this disclosure. In the HC Test, the activator is dissolved in a high boiling point fully saturated hydrocarbon solvent at room temperature. (Room temperature is approximately 22.0±2.5° C.)

The HC Test measures the dissipation factor (at 60 Hz) and conductivity for the hydrocarbon samples. Each of the hydrocarbon samples is measured using a Novocontrol Technologies Broadband Dielectric Spectrometer (Alpha-A) using standard methods. Other than the gentle heating, all sample preparation steps and measurements were performed at room temperature.

To prepare the hydrocarbon samples, an amount of the activator is added to approximately 10 mL of hydrocarbon solvent to create samples having a concentration of approximately 200 µM activator in solution. In a water-containing hydrocarbon sample, deionized water is added to obtain a concentration of approximately 20 mM, and an amount of activator is added to obtain a 200 µM activator hydrocarbon solution. All samples are heated below the boiling point of the hydrocarbon to remove the water and any residual low boiling point solvents. The dissipation factor and conductivity are measured, as described in the preceding paragraph.

The ratio of total number of moles of the one or more Group IV metal-ligand complexes in the catalyst system to total number of moles of the one or more metallic activator ionic complex in the catalyst system is from 1:10,000 to 100:1.

In illustrative embodiments, the catalyst systems may include a metallic activator ionic complex comprising an anion and a countercation, in which the anion is according to formula (I). The illustrative embodiments include the anionic structure complexed with a countercation as described in this disclosure, and have the following structure:

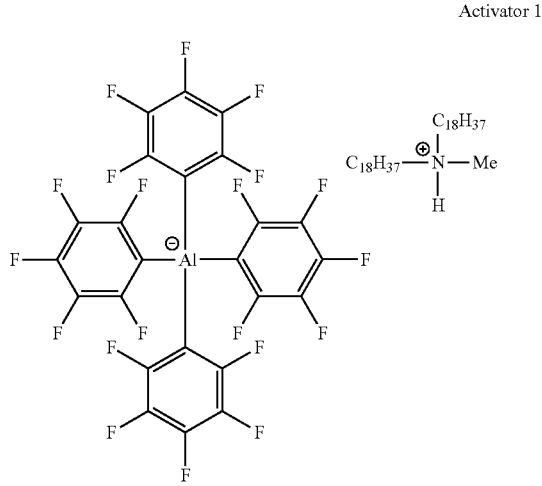

Activator 1

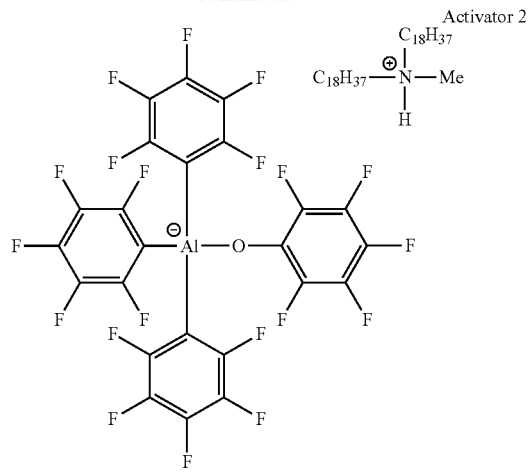

Activator 2

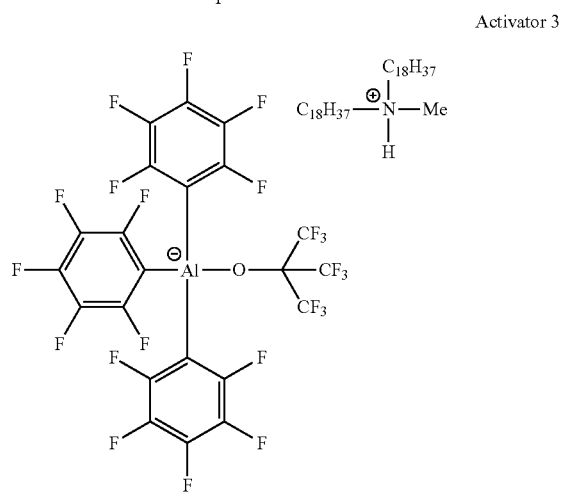

Activator 3

Polymeric Electrical Properties

The electrical insulating efficiency of a medium, such as a polymer material, may be assessed in view of the electrical resistance of the medium and the electrical loss of the medium. Electrical loss lowers the efficiency by which the insulating medium electrically insulates in the presence of an electric field. The resistance of the insulating medium should be as high as possible for both alternating current (AC) and direct current (DC) systems, because the resistance is inversely related to the power or electric loss.

In a DC system such as a photovoltaic device encapsulated in an insulating medium such as polymer material, electric loss manifests as the leakage of current from the encapsulated device through the encapsulant to the external environment. This current (I) is directly related to the voltage (V) of the insulating medium and inversely related to the resistance (R) of the insulating medium according to the equation $I=V \times R^{-1}$. Therefore, the higher the resistance, the lower the current and the current leakage.

In an AC system including an insulating medium such as cable insulation, electric loss manifests as the absorption of energy by the insulating medium in the presence of an electrical field. Measured in power (P), this loss is determined by the equation $P=V^2 \times \omega \times C \times \varepsilon' \times \tan \delta$ where $\omega$ is the angular frequency, $\varepsilon'$ is the relative permittivity, C is the capacitance, and $\tan \delta$ is the dissipation factor, $\tan \delta = (C \times R \times \omega)^{-1}$, resulting in the equation $P=V^2 \times \varepsilon' \times R^{-1}$. Since the resistance is inversely related to the power loss, the higher the resistance, the lower the power loss.

The electrical resistance of a medium is generally decreased as a result of ionic diffusion caused by an external electric field. In a system in which ionic diffusion dominates the electrical response, the resistance is related to the diffusing ions according to the equation $R = 6 \times \pi \times \varepsilon' \times \varepsilon_0 \times \eta \times r \times C^{-1} \times q^{-2} \times N^{-1}$ where $\varepsilon_0$ is the permittivity of vacuum ($8.854 \times 10^{-12}$ F·m$^{-1}$), $\eta$ is the dynamic viscosity of the medium, r is the hydrodynamic radius of the ion, q is the charge of the ion, and N is the concentration of the ion. Since increased resistance decreases energy loss and a decrease in ion concentration increases resistance, a reduction in the concentration of ions diffusing through the medium decreases energy loss.

An ion's ability to diffuse through a given medium is influenced by the size of the ion, the charge of the ion, the interaction of the ion with the surrounding medium, and the ion's dissociation energy with available counterions. Since not all ions diffuse equally through the given medium, when the medium is a polymer, the diffusivity of the ions generally affects the insulation ability of the polymer. Without intending to be bound by theory, it is believed that produced polymers of the catalyst systems of this disclosure have desirable electrical properties such as decreased electrical loss, because the anions of the ionic metallic activator complex of formula (I) are less able to diffuse through the produced polymer.

Catalyst System Components

The catalyst system may include a procatalyst. The procatalyst may be rendered catalytically active by contacting the complex to, or combining the complex with, a metallic activator having anion of formula (I) and a countercation. The procatalyst may include one or more than one Group IV metal-ligand complex (Group IVB according to CAS or Group 4 according to IUPAC naming conventions), such as a titanium (Ti) metal-ligand complex, a zirconium (Zr) metal-ligand complex, or a hafnium (Hf) metal-ligand complex. Non-limiting examples of the procatalyst include catalysts, procatalysts, or catalytically active compounds for polymerizing ethylene based polymers disclosed in one or more of U.S. Pat. No. 8,372,927; WO 2010022228; WO 2011102989; U.S. Pat. Nos. 6,953,764; 6,900,321; WO 2017173080; U.S. Pat. Nos. 7,650,930; 6,777,509 WO 99/41294; U.S. Pat. No. 6,869,904; or WO 2007136496, all of which documents are incorporated herein by reference in their entirety.

In one or more embodiments, the Group IV metal-ligand complex includes a bis-biphenylphenoxy Group IV metal-ligand complex or a constrained geometry Group IV metal-ligand complex.

According to some embodiments, the bis-biphenylphenoxy Group IV metal-ligand complex has a structure according to formula (XI):

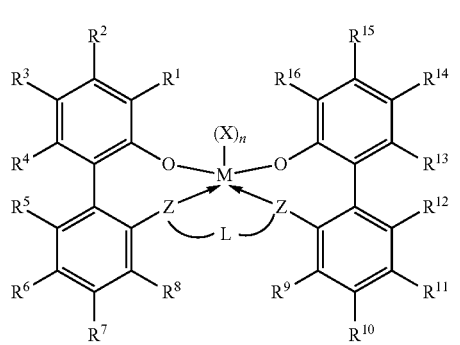

In formula (XI), M is a metal chosen from titanium, zirconium, or hafnium, the metal being in a formal oxidation state of +2, +3, or +4. Subscript n of $(X)_n$ is 0, 1, or 2. When subscript n is 1, X is a monodentate ligand or a bidentate ligand, and when subscript n is 2, each X is a monodentate ligand. L is a diradical selected from the group consisting of $(C_1-C_{40})$hydrocarbylene, $(C_1-C_{40})$heterohydrocarbylene, —Si($R^C$)$_2$, —Si($R^C$)$_2$OSi($R^C$)$_2$—, —Si($R^C$)$_2$C($R^C$)$_2$—, —Si($R^C$)$_2$Si($R^C$)$_2$—, —Si($R^C$)$_2$C($R^C$)$_2$Si($R^C$)$_2$—, —C($R^C$)$_2$Si($R^C$)$_2$C($R^C$)$_2$—, —N($R^N$)C($R^C$)$_2$—, —N($R^N$)N($R^N$)—, —C($R^C$)$_2$N($R^N$)C($R^C$)$_2$—, —Ge($R^C$)$_2$—, P($R^P$)—, N($R^N$)—, —O—, —S—, —S(O)—, —S(O)$_2$—, —N=C($R^C$)—, —C(O)O—, —OC(O)—, —C(O)N(R)—, and —N($R^C$)C(O)—. Each Z is independently chosen from —O—, —S—, —N($R^N$)—, or —P($R^P$)—; $R^{2-4}$, $R^{5-8}$, $R^{9-12}$ and $R^{13-15}$ are independently selected from the group consisting of —H, $(C_1-C_{40})$hydrocarbyl, $(C_1-C_{40})$heterohydrocarbyl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, $R^C$S(O)—, $R^C$S(O)$_2$—, —N=C($R^C$)$_2$, $R^C$C(O)O—, $R^C$OC(O)—, $R^C$C(O)N(R)—, ($R^C$)$_2$NC(O)—, and halogen. $R^1$ and $R^{16}$ are selected from radicals having formula (XII), radicals having formula (XIII), and radicals having formula (XIV):

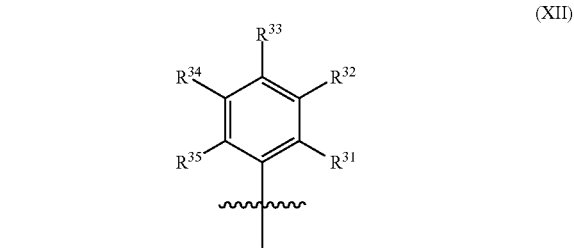

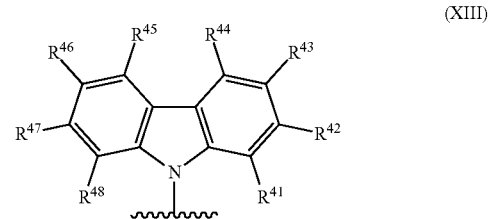

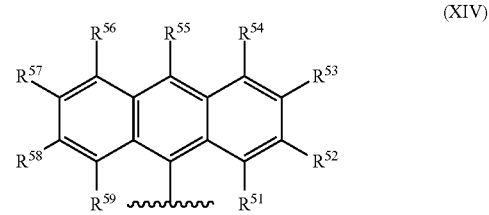

In formulas (XII), (XIII), and (XIV), each of $R^{31}$-$R^{35}$, $R^{41}$-$R^{48}$, and $R^{51}$—$R^{59}$ is independently chosen from —H, $(C_1-C_{40})$hydrocarbyl, $(C_1-C_{40})$heterohydrocarbyl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^C$)$_2$NC(O)—, or halogen.

In one or more embodiments, each X can be a monodentate ligand that, independently from any other ligands X, is a halogen, unsubstituted $(C_1-C_{20})$hydrocarbyl, unsubstituted ($C_1$-$C_{20}$)hydrocarbylC(O)O—, or $R^K R^L N$—, wherein each of $R^K$ and $R^L$ independently is an unsubstituted ($C_1$-$C_{20}$) hydrocarbyl.

Illustrative metal-ligand complexes according to formula (XI) include, for example:

(2',2"-(propane-1,3-diylbis(oxy))bis(5'-chloro-3-(3,6-di-tert-octyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(3-(3,6-di-tert-butyl-9H-carbazol-9-yl)-3'-chloro-5-(2,4,4-trimethylpentan-2-yl)biphenyl-2-ol)dimethyl-hafnium;

(2',2"-(propane-1,3-diylbis(oxy))bis(3'-chloro-3-(3,6-di-tert-butyl-9H-carbazol-9-yl)-5'-fluoro-5-(2,4,4-trimethylpentan-2-yl)biphenyl-2-ol)dimethyl-hafnium;

(2',2"-(propane-1,3-diylbis(oxy))bis(3-(3,6-di-tert-butyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(5'-cyano-3-(3,6-di-tert-butyl-9H-carbazol-9-yl)-3'-methyl-5-(2,4,4-trimethylpentan-2-yl)biphenyl)-2-ol)dimethyl-hafnium;

(2',2"-(propane-1,3-diylbis(oxy))bis(5'-dimethylamino-3-(3,6-di-tert-butyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(3',5'-dimethyl-3-(3,6-di-tert-butyl-9H-carbazol-9-yl)-5-(2,4,4-trimethylpentan-2-yl)biphenyl-2-ol)dimethyl-hafnium;

(2',2"-(propane-1,3-diylbis(oxy))bis(5'-chloro-3-(3,6-di-tert-butyl-9H-carbazol-9-yl)-3'-ethyl-5-(2,4,4-trimethylpentan-2-yl) biphenyl-2-ol)dimethyl-hafnium;

(2',2"-(propane-1,3-diylbis(oxy))bis(3-(3,6-di-tert-butyl-9H-carbazol-9-yl)-3'-methyl-5'-tert-butyl-5-(2,4,4-trimethylpentan-2-yl)biphenyl-2-ol)dimethyl-hafnium;

(2'2"-(propane-1,3-diylbis(oxy))bis(3-(3,6-di-tert-butyl-9H-carbazol-9-yl)-5'-fluoro-3'-methyl-5-(2,4,4-trimethylpentan-2-yl)biphenyl-2-ol)dimethyl-hafnium;

(2',2"-(propane-1,3-diylbis(oxy))bis(3-(9H-carbazol-9-yl)-5'-chloro-3'-methyl-5-(2,4,4-trimethylpentan-2-yl)biphenyl-2-ol)dimethyl-hafnium;

(2',2"-(propane-1,3-diylbis(oxy))bis(3-(3,6-di-tert-butyl-9H-carbazol-9-yl)-3'-methyl-5'-trifluoromethyl-5-(2,4,4-trimethylpentan-2-yl)biphenyl-2-ol)dimethyl-hafnium;

(2',2"-(2,2-dimethyl-2-silapropane-1,3-diylbis(oxy))bis(3', 5'-dichloro-3-(3,6-di-tert-butyl-9H-carbazol-9-yl)-5-(2,4, 4-trimethylpentan-2-yl)biphenyl-2-ol)dimethyl-hafnium;

(2'2"-(2,2-dimethyl-2-silapropane-1-diylbis(oxy))bis(5'-chloro-3-(3,6-di-tert-butyl-9 carbazol-9-yl)-3'-methyl-5-(2,4,4 rimethylpentan-2-yl)biphenyl-2-ol)dimethyl-hafnium;

(2',2"-(propane-1,3-diylbis(oxy))bis(3'-bromo-5'-chloro-3-(3,6-di-tert-butyl-9H-carbazol-9-yl)-5-(2,4,4-trimethylpentan-2-yl)biphenyl-2-ol)dimethyl-hafnium;

(2',2"-(propane-1,3-diylbis(oxy))-(5'-chloro-3-(3,6-di-tert-butyl-9H-carbazol-9-yl)-3'-fluoro-5-(2,4,4-trimethylpentan-2-yl)biphenyl-2-ol)-3"5"-dichloro-3-(3,6-di-tert-butyl-9H-carbazol-9-yl)-5-(2,4,4-trimethylpentan-2-yl) biphenyl-2-ol)dimethyl-hafnium;

(2'2"-(propane-1,3-diylbis(oxy))bis(3-(3,6-di-tert-butyl-9H-carbazol-9-yl)-5'-fluoro-3'-trifluoromethyl-5-(2,4,4-trimethylpentan-2-yl)biphenyl-2-ol)dimethyl-hafnium;

(2',2"-(butane-1,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;

(2',2"-(ethane-1,2-diylbis(oxy)bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-zirconium;

(2',2"-(propane-1,3-diylbis(oxy))bis(3-(3,6-di-tert-butyl-9H-carbazol-9-yl)-3',5'-dichloro-5-(2,4,4-trimethylpentan-2-yl)biphenyl-2-ol)dimethyl-titanium; and (2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-titanium.

Other bis-biphenylphenoxy metal-ligand complexes that may be used in combination with the metallic activators in the catalyst systems of this disclosure will be apparent to those skilled in the art.

According to some embodiments, the Group IV metal-ligand complex may include a Group IV metal-ligand complexes according to formula (XV):

$$Lp_i MX_m X'_n X''_p, \text{ or a dimer thereof} \quad (XV).$$

In formula (XV), Lp is an anionic, delocalized, π-bonded group that is bound to M, containing up to 50 non-hydrogen atoms. In some embodiments of formula (XV), two Lp groups may be joined together forming a bridged structure, and further optionally one Lp may be bound to X.

In formula (XV), M is a metal of Group 4 of the Periodic Table of the Elements in the +2, +3 or +4 formal oxidation state. X is an optional, divalent substituent of up to 50 non-hydrogen atoms that together with Lp forms a metallocycle with M. X' is an optional neutral ligand having up to 20 non hydrogen atoms; each X" is independently a monovalent, anionic moiety having up to 40 non-hydrogen atoms. Optionally, two X" groups may be covalently bound together forming a divalent dianionic moiety having both valences bound to M, or, optionally two X" groups may be covalently bound together to form a neutral, conjugated or nonconjugated diene that is π-bonded to M, in which M is in the +2 oxidation state. In other embodiments, one or more X" and one or more X' groups may be bonded together thereby forming a moiety that is both covalently bound to M and coordinated thereto by means of Lewis base functionality.

Illustrative constrained geometry Group IV complexes that may be employed in the practice of the present invention include:

cyclopentadienyltitaniumtrimethyl;
cyclopentadienyltitaniumtriethyl;
cyclopentadienyltitaniumtriisopropyl;
cyclopentadienyltitaniumtriphenyl;
cyclopentadienyltitaniumtribenzyl;
cyclopentadienyltitanium-2,4-dimethylpentadienyl;
cyclopentadienyltitanium-2,4-dimethylpentadienyl.triethylphosphine;
cyclopentadienyltitanium-2,4-dimethylpentadienyl.trimethylphosphine;
cyclopentadienyltitaniumdimethylmethoxide;
cyclopentadienyltitaniumdimethylchloride;
pentamethylcyclopentadienyltitaniumtrimethyl;
indenyltitaniumtrimethyl;
indenyltitaniumtriethyl;
indenyltitaniumtripropyl;
indenyltitaniumtriphenyl;
tetrahydroindenyltitaniumtribenzyl;
pentamethylcyclopentadienyltitaniumtriisopropyl;
pentamethylcyclopentadienyltitaniumtribenzyl;
pentamethylcyclopentadienyltitaniumdimethylmethoxide;
pentamethylcyclopentadienyltitaniumdimethylchloride;
bis($\eta^5$-2,4-dimethylpentadienyl)titanium;

bis(η⁵-2,4-dimethylpentadienyl)titanium.trimethylphosphine;
bis(η⁵-2,4-dimethylpentadienyl)titanium.triethylphosphine;
octahydrofluorenyltitaniumtrimethyl;
tetrahydroindenyltitaniumtrimethyl;
tetrahydrofluorenyltitaniumtrimethyl;
(tert-butylamido)(1,1-dimethyl-2,3,4,9,10-η-1,4,5,6,7,8-hexahydronaphthalenyl)dimethylsilanetitaniumdimethyl;
(tert-butylamido)(1,1,2,3-tetramethyl-2,3,4,9,10-η-1,4,5,6,7,8-hexahydronaphthalenyl)dimethylsilanetitaniumdimethyl;
(tert-butylamido)(tetramethyl-η⁵-cyclopentadienyl) dimethylsilanetitanium dibenzyl;
(tert-butylamido)(tetramethyl-η⁵-cyclopentadienyl)dimethylsilanetitanium dimethyl;
(tert-butylamido)(tetramethyl-η⁵-cyclopentadienyl)-1,2-ethanediyltitanium dimethyl;
(tert-butylamido)(tetramethyl-η⁵-indenyl)dimethylsilanetitanium dimethyl;
(tert-butylamido)(tetramethyl-η⁵-cyclopentadienyl)dimethylsilane titanium (III) 2-(dimethylamino)benzyl
(tert-butylamido)(tetramethyl-η⁵-cyclopentadienyl)dimethylsilanetitanium (III) allyl;
(tert-butylamido)(tetramethyl-η⁵-cyclopentadienyl)dimethylsilanetitanium (III) 2,4-dimethylpentadienyl;
(tert-butylamido)(tetramethyl-η⁵-cyclopentadienyl)dimethylsilanetitanium (II) 1,4-diphenyl-1,3-butadiene;
(tert-butylamido)(tetramethyl-η⁵-cyclopentadienyl)dimethylsilanetitanium (II) 1,3-pentadiene;
(tert-butylamido))(2-methylindenyl)dimethylsilanetitanium (II) 1,4-diphenyl-1,3-butadiene;
(tert-butylamido)(2-methylindenyl)dimethylsilanetitanium (II) 2,4-hexadiene;
(tert-butylamido)(2-methylindenyl)dimethylsilanetitanium (IV) 2,3-dimethyl-1,3-butadiene;
(tert-butylamido)(2-methylindenyl)dimethylsilanetitanium (IV) isoprene;
(tert-butylamido)(2-methylindenyl)dimethylsilanetitanium (IV) 1,3-butadiene;
(tert-butylamido)(2,3-dimethylindenyl)dimethylsilanetitanium (IV) 2,3-dimethyl-1,3-butadiene;
(tert-butylamido)(2,3-dimethylindenyl)dimethylsilanetitanium (IV) isoprene;
(tert-butylamido)(2,3-dimethylindenyl)dimethylsilanetitanium (IV) dimethyl;
(tert-butylamido)(2,3-dimethylindenyl)dimethylsilanetitanium (IV) dibenzyl;
(tert-butylamido)(2,3-dimethylindenyl)dimethylsilanetitanium (IV) 1,3-butadiene;
(tert-butylamido)(2,3-dimethylindenyl)dimethylsilanetitanium (II) 1,3-pentadiene;
(tert-butylamido)(2,3-dimethylindenyl)dimethylsilanetitanium (II) 1,4-diphenyl-1,3-butadiene;
(tert-butylamido)(2-methylindenyl)dimethylsilanetitanium (II) 1,3-pentadiene;
(tert-butylamido)(2-methylindenyl)dimethylsilanetitanium (IV) dimethyl;
(tert-butylamido)(2-methylindenyl)dimethylsilanetitanium (IV) dibenzyl;
(tert-butylamido)(2-methyl-4-phenylindenyl)dimethylsilanetitanium (II) 1,4-diphenyl-1,3-butadiene;
(tert-butylamido)(2-methyl-4-phenylindenyl)dimethylsilanetitanium (II) 1,3-pentadiene;
(tert-butylamido)(2-methyl-4-phenylindenyl)dimethylsilanetitanium (II) 2,4-hexadiene;
(tert-butylamido)(tetramethyl-η⁵-cyclopentadienyl)dimethyl-silanetitanium (IV) 1,3-butadiene;
(tert-butylamido)(tetramethyl-η⁵-cyclopentadienyl)dimethyisilanetitanium (IV) 2,3-dimethyl-1,3-butadiene;
(tert-butylamido)(tetramethyl-η⁵-cyclopentadienyl)dimethylsilanetitanium (IV) isoprene;
(tert-butylamido)(tetramethyl-η⁵-cyclopentadienyl)dimethyl-silanetitanium (II) 1,4-dibenzyl-1,3-butadiene;
(tert-butylamido)(tetramethyl-η⁵-cyclopentadienyl)dimethyisilanetitanium (II) 2,4-hexadiene;
(tert-butylamido)(tetramethyl-η⁵-cyclopentadienyl)dimethyl-silanetitanium (II) 3-methyl-1,3-pentadiene;
(tert-butylamido)(2,4-dimethylpentadien-3-yl)dimethylsilanetitaniumdimethyl;
(tert-butylamido)(6,6-dimethylcyclohexadienyl)dimethylsilanetitaniumdimethyl;
(tert-butylamido)(1,1-dimethyl-2,3,4,9,10-η-1,4,5,6,7,8-hexahydronaphthalen-4-yl)dimethylsilanetitaniumdimethyl;
(tert-butylamido)(1,1,2,3-tetramethyl-2,4,9,10-η-1,4,5,6,7,8-hexahydronaphthalen-4-yl)dimethylsilanetitaniumdimethyl;
(tert-butylamido)(tetramethyl-η⁵-cyclopentadienyl methylphenylsilanetitanium (IV) dimethyl;
(tert-butylamido)(tetramethyl-η⁵-cyclopentadienyl methylphenylsilanetitanium (II) 1,4-diphenyl-1,3-butadiene;
1-(tert-butylamido)-2-(tetramethyl-η⁵-cyclopentadienyl) ethanediyltitanium (IV) dimethyl;
1-(tert-butylamido)-2-(tetramethyl-η⁵-cyclopentadienyl) ethanediyl-titanitim (II) 1,4-diphenyl-1,3-butadiene;

Other catalysts, especially catalysts containing other Group IV metal-ligand complexes, will be apparent to those skilled in the art.

The catalyst systems of this disclosure may include co-catalysts or activators in addition to the metallic activator ionic complex having the anion of formula (I) and a countercation. Such additional co-catalysts may include, for example, tri(hydrocarbyl)aluminum compounds having from 1 to 10 carbons in each hydrocarbyl group, an oligomeric or polymeric alumoxane compound, di(hydrocarbyl)(hydrocarbyloxy)aluminums compound having from 1 to 20 carbons in each hydrocarbyl or hydrocarbyloxy group, or mixtures of the foregoing compounds. These aluminum compounds are usefully employed for their beneficial ability to scavenge impurities such as oxygen, water, and aldehydes from the polymerization mixture.

The di(hydrocarbyl)(hydrocarbyloxy)aluminum compounds that may be used in conjunction with the activators described in this disclosure correspond to the formula $T^1_2AlOT^2$ or $T_1Al(OT^2)_2$ wherein $T^1$ is a secondary or tertiary $(C_3\text{-}C_6)$alkyl, such as isopropyl, isobutyl or tert-butyl; and $T^2$ is a alkyl substituted $(C_6\text{-}C_{30})$aryl radical or aryl substituted $(C_1\text{-}C_{30})$alkyl radical, such as 2,6-di(tert-butyl)-4-methylphenyl, 2,6-di(tert-butyl)-4-methylphenyl, 2,6-di(tert-butyl)-4-methyltolyl, or 4-(3',5'-di-tert-butyltolyl)-2,6-di-tert-butylphenyl.

Additional examples of aluminum compounds include [$C_6$]trialkyl aluminum compounds, especially those wherein the alkyl groups are ethyl, propyl, isopropyl, n-butyl, isobutyl, pentyl, neopentyl, or isopentyl, dialkyl(aryloxy) aluminum compounds containing from 1-6 carbons in the alkyl group and from 6 to 18 carbons in the aryl group (especially (3,5-di(t-butyl)-4-methylphenoxy)diisobutylaluminum), methylalumoxane, modified methylalumoxane and diisobutylalumoxane.

In the catalyst systems according to embodiments of this disclosure, the molar ratio of the metallic activator ionic complex to Group IV metal-ligand complex may be from 1:10,000 to 1000:1, such as, for example, from 1:5000 to 100:1, from 1:100 to 100:1 from 1:10 to 10:1, from 1:5 to 1:1, or from 1.25:1 to 1:1. The catalyst systems may include combinations of one or more metallic activator ionic complex described in this disclosure.

The catalyst systems of this disclosure may include co-catalysts or activators in addition to the metallic activator ionic complex having the anion of formula (I) and a countercation. Such additional co-catalysts may include, for example, tri(hydrocarbyl)aluminum compounds having from 1 to 10 carbons in each hydrocarbyl group, an oligomeric or polymeric alumoxane compound, di(hydrocarbyl)(hydrocarbyloxy)aluminums compound having from 1 to 20 carbons in each hydrocarbyl or hydrocarbyloxy group, or mixtures of the foregoing compounds. These aluminum compounds are usefully employed for their beneficial ability to scavenge impurities such as oxygen, water, and aldehydes from the polymerization mixture.

The di(hydrocarbyl)(hydrocarbyloxy)aluminum compounds that may be used in conjunction with the activators described in this disclosure correspond to the formula $T^1_2AlOT^2$ or $T_1Al(OT^2)_2$ wherein $T^1$ is a secondary or tertiary $(C_3-C_6)$alkyl, such as isopropyl, isobutyl or tert-butyl; and $T^2$ is a alkyl substituted $(C_6-C_{30})$aryl radical or aryl substituted $(C_1-C_{30})$alkyl radical, such as 2,6-di(tert-butyl)-4-methylphenyl, 2,6-di(tert-butyl)-4-methylphenyl, 2,6-di(tert-butyl)-4-methyltolyl, or 4-(3',5'-di-tert-butyl-tolyl)-2,6-di-tert-butylphenyl.

Additional examples of aluminum compounds include $[C_6]$trialkyl aluminum compounds, especially those wherein the alkyl groups are ethyl, propyl, isopropyl, n-butyl, isobutyl, pentyl, neopentyl, or isopentyl, dialkyl(aryloxy)aluminum compounds containing from 1-6 carbons in the alkyl group and from 6 to 18 carbons in the aryl group (especially (3,5-di(t-butyl)-4-methylphenoxy)diisobutylaluminum), methylalumoxane, modified methylalumoxane and diisobutylalumoxane.

In the catalyst systems according to embodiments of this disclosure, the molar ratio of the metallic activator ionic complex to Group IV metal-ligand complex may be from 1:10,000 to 1000:1, such as, for example, from 1:5000 to 100:1, from 1:100 to 100:1 from 1:10 to 10:1, from 1:5 to 1:1, or from 1.25:1 to 1:1. The catalyst systems may include combinations of one or more metallic activator ionic complex described in this disclosure.

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms, Exemplary α-olefin co-monomers include, but are not limited to, propylene, 1-butene, 1-pentene, 1-hexene, 1-heptene, 1-octene, 1-nonene, 1-decene, 4-methyl-1-pentene, 5-ethyldiene-2-norbornene, and 5-vinyl-2-norbornene. For example, the one or more α-olefin co-monomers may be selected from the group consisting of propylene, 1-butene, 1-hexene, and 1-octene; or in the alternative, from the group consisting of 1-hexene and 1-octene.

Ethylene-based polymers, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least mole percent" are disclosed herein as separate embodiments; for example, the ethylene-based polymers, homopolymers and/or interpolymers (including copolymers) of ethylene and optionally one or more co-monomers such as α-olefins may comprise at least 60 mole percent monomer units derived from ethylene; at least 70 mole percent monomer units derived from ethylene; at least 80 mole percent monomer units derived from ethylene; or from 50 to 100 mole percent monomer units derived from ethylene; or from 80 to 100 mole percent units derived from ethylene.

In some embodiments, the polymerization process of this disclosure produces ethylene-based polymers that may comprise at least 90 mole percent units derived from ethylene. All individual values and subranges from at least 90 mole percent are included herein and disclosed herein as separate embodiments. For example, the ethylene-based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene-based polymer, the ethylene-based polymers may comprise an amount of $(C_3-C_{40})$α-olefin. The amount of $(C_3-C_{40})$α-olefin is less than 50 mole percent. In some embodiments, the ethylene-based polymer may include at least 0.5 mole percent to 25 mol % of $(C_3-C_{40})$α-olefin; and in further embodiments, the ethylene-based polymer may include at least 5 mol % to 10 mol % of $(C_3-C_{40})$α-olefin. In some embodiments, the $(C_3-C_{40})$ α-olefin is 1-octene.

Any conventional polymerization process, in combination with a catalyst system according to embodiments of this disclosure may be used to produce the ethylene-based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene-based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single loop reactor system, in which ethylene and optionally one or more α-olefins are polymerized in the presence of the catalyst system, as described within this disclosure.

The polymer process may further include incorporating one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may comprise from about 0 to about 10 percent by the combined weight of such additives, based on the weight of the ethylene-based polymers and the one or more additives. The ethylene-based polymers may further comprise fillers, which may include, but are not limited to, organic or inorganic fillers. The ethylene-based polymers may contain from about 0 to about 20 weight percent fillers such as, for example, calcium carbonate, talc, or $Mg(OH)_2$, based on the combined weight of the ethylene-based polymers and all additives or fillers. The ethylene-based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex and a metallic activator ionic complex. The polymer resulting from such a catalyst system that incorporates the metal-ligand complex and the metallic activator ionic complex may have a density according to ASTM D792 (incorporated herein by reference in its entirety) from 0.850 $g/cm^3$ to 0.950 $g/cm^3$, from 0.870 $g/cm^3$ to 0.920 $g/cm^3$, from 0.870 $g/cm^3$ to 0.910 $g/cm^3$, or from 0.870 $g/cm^3$ to 0.900 $g/cm^3$, for example.

In another embodiment, the polymer resulting from the catalyst system that includes the metal-ligand complex and a metallic activator ionic complex has a melt flow ratio $(I_{10}/I_2)$ from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio $(I_{10}/I_2)$ is from 5 to 10, and in others, the melt flow ratio is from 5 to 9.

In some embodiments, the polymer resulting from the catalyst system that includes the metal-ligand complex and the metallic activator ionic complex has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties such as narrow composition and narrow molecular weight.

Batch Reactor Procedure

A 2 L Parr reactor is used for all polymerization experiments. The reactor is heated via an electrical heating mantle and is cooled via an internal serpentine cooling coil containing water. Both the reactor and the heating/cooling system are controlled and monitored by a Camile TG process computer. All chemicals used for polymerization or catalyst makeup were run through purification columns. 1-octene, toluene, and Isopar-E (a mixed alkanes solvent available from ExxonMobil, Inc.) are passed through 2 columns, the first containing A2 alumina, and the second containing Q5 reactant (available from Engelhard Chemicals Inc.). Ethylene gas is passed through two columns, the first containing A204 alumina and activated 4 Å molecular sieves, the second containing Q5 reactant. Hydrogen gas is passed through Q5 reactant and A2 alumina. Nitrogen gas is passed through a single column containing A204 alumina, activated 4A° molecular sieves and Q5 reactant. Catalyst and metallic activator ionic complex solutions are handled in a nitrogen-filled glovebox.

The load column is filled with Isopar-E and 1-octene to the load setpoints by use of an Ashcroft differential pressure cell, and the material is transferred into the reactor. Once complete, the reactor immediately begins heating toward the reaction setpoint. Hydrogen gas (as specified) is loaded into the reactor, via a shot tank with an internal volume of approximately 75 mL, immediately following the solvent/comonomer addition. Triethylaluminum ($AlEt_3$) (10 μmol) solution is added to the reactor via the shot tank once 25° C. prior to the setpoint. At 10° C. prior to reaching the setpoint, ethylene is added to the specified pressure as monitored via a micro-motion flow meter. Then, dilute toluene solutions of catalyst and metallic activator ionic complex (as specified) are mixed, transferred to the shot tank, and added to the reactor to begin the polymerization reaction. The polymerization conditions are maintained for 10 minutes with supplemental ethylene added on demand to maintain the specified pressure. Exothermic heat was continuously removed from the reaction vessel via the internal cooling coil. The resulting solution was removed from the reactor and stabilized by addition of 5 mL of a toluene solution containing approximately 33.5 mg of a hindered phenol antioxidant (Irganox 1010 from Ciba Geigy Corp.) and 66.5 mg of a phosphorus stabilizer (Irgafos 168 from Ciba Geigy Corp.). The produced polymers are recovered by evaporating in a hood overnight and then drying for about 12 h in a temperature-ramped vacuum oven with a final set point of 140° C. Between polymerization runs, at least one wash cycle is conducted in which Isopar-E (850 g) is added, and the reactor is heated to a setpoint between 160° C. and 190° C. Then the reactor is emptied of the heated solvent immediately before beginning a new polymerization run.

EXAMPLES

Examples 1-2 are synthetic procedures for intermediates of Activator 1 and Example 3 is the synthetic procedure for Activator 1. Examples 4-6 are synthetic procedures for intermediates of Activator 2 and Example 7 is the synthetic procedure for Activator 2. Example 8 is the synthetic procedure for the intermediate of Activator 3 and Example 9 is the synthetic procedure for Activator 3. In Example 10, various activators were used to synthesize polymer resins. The polymer resin characteristics were measured and recorded in Tables 1-7. One or more features of the present disclosure are illustrated in view of the examples as follows:

Example 1: Synthesis of Activator 1 Precursor—Synthesis of Lithium Tetrakis(pentafluorophenyl)aluminate

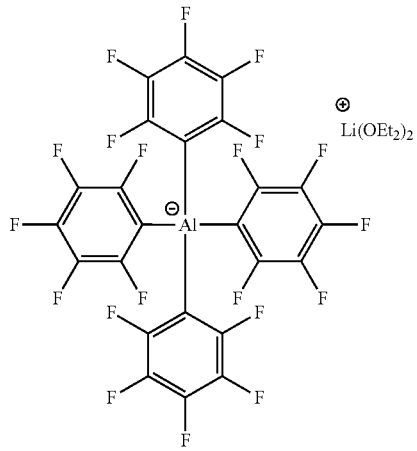

In a nitrogen-filled glovebox, a 100 mL round-bottom flask was charged with bromopentafluorobenzene (1.0 mL, 8.02 mmol, 4 equiv.) and diethyl ether (17 mL). The vessel was sealed with a septum, removed from the box, and attached to a nitrogen-filled Schlenk line. The reaction was cooled in a dry ice/isopropanol bath for 2 h. A 1.65 M solution of n-BuLi in hexane (4.86 mL, 8.02 mmol, 4.0 equiv.) was added dropwise. The reaction was stirred at −78° C. for 20 min. A solution of $AlCl_3$ (267.4 mg, 2.00 mmol, 1 equiv.) in diethyl ether (5.5 mL) was added via syringe. The $AlCl_3$ solution vial was rinsed with additional diethyl ether (5.5 mL) and this was added to the solution. The solution was slowly heated to room temperature and stirred for a total of 18 h, forming a solid participated in the solution. The suspension was transferred back into the glovebox. The suspension was passed through a 0.45 μm syringe filter in line with a 0.2 μm syringe filter. The filters were washed twice with 4 mL of diethyl ether. The combined filtrates were concentrated in vacuo to yield a thick oil with some white precipitate. The white precipitate was triturated with hexane (10 mL), and all volatiles were removed in vacuo to afford an off-white solid. The residue was dissolved in toluene (10 mL). The solution was passed through a 0.45 μm syringe filter in line with a 0.2 μm syringe filter. The filter was washed twice with 5 mL of toluene, and the combined filtrates were concentrated in vacuo to yield a clear oil. The material was triturated with hexane (10 mL) and dried in vacuo (this process was repeated for a total of two times) to afford 1.63 g of the product as a white solid, a 96% yield. The yield was calculated based up two equivalents of diethyl ether coordinated to the lithium cation.

$^1$H NMR (400 MHz, THF-$d_8$) δ 3.38 (q, J=7.0 Hz, 1H), 1.11 (t, J=7.0 Hz, 1H). $^{19}$F NMR (376 MHz, THF-$d_8$) δ −119.03 (8F, d, J=26.8 Hz), −156.28 (4F, t, J=19.1 Hz), −162.09 (8F, ddd, J=30.4, 19.1, 12.3 Hz). $^{13}$C NMR (126 MHz, THF-$d_8$) δ 149.23-148.19 (m), 147.45-146.27 (m), 139.76-138.75 (m), 137.67-136.72 (m), 135.51-134.77 (m), 133.80-132.64 (m), 63.43, 12.79. $^{27}$Al NMR (104 MHz, THF-$d_8$) δ 116.34. HRMS (ESI) Calculated for $C_{24}AlF_{20}$ [M$^−$] 694.9502; found 694.9465.

Example 2: Synthesis of Activator 1 Countercation: Synthesis of Armeenium M2HT Chloride

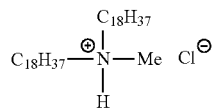

In a nitrogen-filled glovebox, Armeen M2HT, a di-hydrogenated tallow alkyl methyl amine available from AkzoNobel. (5.36 g, 10.0 mmol, 1 equiv.) was dissolved in hexane (150 mL). A 2 M solution of HCl in diethyl ether (5.0 mL, 10.0 mmol, 1 equiv.) was slowly added dropwise to the stirring amine solution, resulting in the immediate precipitation of a white solid. The suspension was stirred at room temperature for 15 min. The precipitated solid was voluminous and fine, producing a thick gel-like suspension. The suspension was attempted to be filtered, however it did not pass through the filter. The suspension was transferred back into a glass jar and dried in vacuo to yield 4.76 g of a white solid, a 83% yield.

$^1$H NMR (400 MHz, Toluene-$d_8$) δ 13.02-12.71 (m, 1H), 2.90 (dtd, J=43.2, 12.4, 6.8 Hz, 4H), 2.67 (d, J=4.7 Hz, 3H), 1.72 (ddt, J=50.3, 13.3, 6.7 Hz, 4H), 1.32 (d, J=22.5 Hz, 60H), 0.91 (t, J=6.6 Hz, 6H). $^{13}$C NMR (101 MHz, Toluene-$d_8$) δ 54.75, 39.08, 32.03, 30.00, 29.98, 29.95, 29.92, 29.86, 29.53, 29.48, 27.04, 23.62, 22.77, 13.96.

Example 3: Synthesis of Activator 1

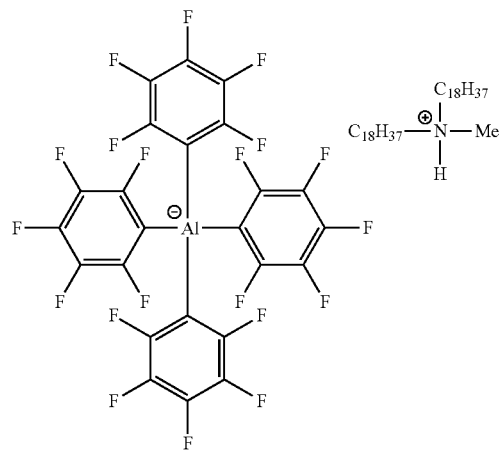

In a nitrogen-filled glovebox, lithium tetrakis(pentafluorophenyl))aluminate (1.40 g, 1.65 mmol, 1 equiv.), Armeenium M2HT chloride (0.943 g, 1.65 mmol, 1 equiv.), and toluene (35 mL) were stirred at room temperature for 1 hour, resulting in a slightly hazy solution. The solution was filtered through a 0.45 μm syringe filter in line with a 0.2 μm syringe filter. The combined filtrates were concentrated in vacuo to yield a hazy oil. The material was triturated with hexane (5 mL) and dried in vacuo (this process was repeated for a total of two times) to yield 1.72 g of the product as a hazy oil, a 85% yield.

$^1$H NMR (400 MHz, Toluene-$d_8$) δ 4.22 (br s, 1H), 2.06-1.95 (m, 4H), 1.68 (s, 3H), 1.40-1.18 (m, 60H), 1.17-1.06 (m, 4H), 0.97-0.88 (m, 6H). $^{19}$F NMR (376 MHz, Toluene-$d_8$) δ −121.84 (8F, dd, J=29.6, 11.3 Hz), −156.99 (4F, t, J=19.6 Hz), −163.42 8F, (ddd, J=30.5, 19.2, 11.8 Hz). $^{13}$C NMR (101 MHz, Toluene-$d_8$) δ 151.65-150.79 (m), 149.45-148.52 (m), 141.99-141.30 (m), 139.48-138.79 (m), 138.07-137.35 (m), 135.70-134.90 (m), 56.54, 39.71, 32.00, 31.60, 29.86, 29.85, 29.80, 29.79, 29.73, 29.54, 29.49, 29.34, 28.89, 25.95, 23.88, 22.73, 13.87. $^{27}$Al NMR (104 MHz, Toluene-$d_8$) δ 115.71. HRMS (ESI) Calculated for $C_{37}H_{78}N$ [M$^+$] 536.6129; found 536.6145. Calculated for $C_{24}AlF_{20}$ [M$^−$] 694.9502; found 694.9520.

Example 4: Synthesis of the Activator 2 Precursor 1—Tris(pentafluorophenyl)alane toluene Adduct

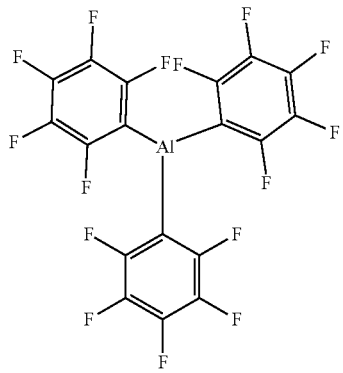

In a nitrogen-filled glovebox, a solution of tris(pentafluorophenyl)borane (0.250 g, 0.488 mmol, 1 equiv.) was dissolved in toluene (1 mL). A solution of trimethylaluminum (47 µL, 0.488 mmol, 1 equiv.) in hexane (4 mL) was added to the toluene solution. The reaction was stirred at room temperature for 3 h. After approximately 5 min, a white precipitate formed. The vial was placed in a −30° C. freezer for 2 days. The solid was filtered, washed with cold (−30° C.) hexane, and dried in vacuo to afford 0.203 g of the product as a white solid, a 72% yield.

$^1$H NMR (400 MHz, Toluene-d$_8$) δ 7.14-7.07 (m, 2H), 7.05-7.01 (m, 1H), 7.00-6.95 (m, 2H), 2.12 (s, 3H). $^{19}$F NMR (376 MHz, Toluene-d$_8$) δ −122.86 (6F, ddd, J=23.0, 8.0, 4.4 Hz), −151.08 (3F, tt, J=20.1, 2.9 Hz), −160.58-161.05 (6F, m).

Example 5: Synthesis of Activator 2 Precursor 2—Lithium Pentafluorophenolate

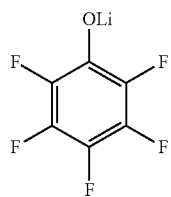

In a nitrogen-filled glovebox, a solution of 1.6 M n-BuLi in hexane (10.7 mL, 17.1 mmol, 1.05 equiv.) was added dropwise to a stirring solution of pentafluorophenol (3.00 g, 16.3 mmol, 1 equiv.) in hexane (50 mL). Immediately, a white solid precipitated from solution. The reaction was stirred at room temperature for 1 h. The solid was filtered, washed with hexane, and dried in vacuo to afford 2.85 g of the product as a white solid, 92% yield.

$^{19}$F NMR (376 MHz, THF-d$_8$) δ −168.96 (dd, J=18.8, 12.6 Hz, 2F), −169.97-−170.24 (m, 2F), −185.62-−186.98 (m, 1F). $^{13}$C NMR (101 MHz, THF-d$_8$) δ 145.94-145.06 (m), 143.77 (tt, J=8.5, 3.3 Hz), 141.98-141.08 (m), 139.77-138.51 (m), 130.32 (dtt, J=232.0, 14.4, 4.7 Hz).

Example 6: Synthesis of Activator 2 Precursor 3—Lithium (Perfluorophenoxy)tris(perfluorophenyl)aluminate

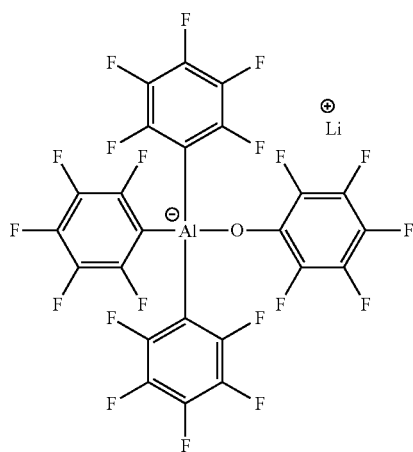

In a nitrogen-filled glovebox, a suspension of tris(pentafluorophenyl)alane toluene adduct (121.4 mg, 0.211 mmol, 1 equiv.) in toluene (1 mL) was added to a vial containing lithium pentafluorophenolate (40.2 mg, 0.211 mmol, 1 equiv.). The tris(pentafluorophenyl)alane vial was washed four times with 0.5 mL of toluene, and toluene from the washes were added to the reaction. After a few minutes, a clear solution was obtained. The reaction was stirred at room temperature for 18 h, yielding a slightly yellow clear solution. The solution was passed through a 0.45 µm syringe filter in line with a 0.2 µm syringe filter. The filters were washed twice with 1 mL of toluene, and the combined filtrates were concentrated in vacuo to afford a slightly hazy thick oil. The oil was triturated with hexane (5 mL) and concentrated in vacuo (this process was repeated for a total of two times) to afford 0.1673 g of the product as a slightly hazy thick oil, a 98% yield. The yield was calculated as the mono-toluene adduct.

$^{19}$F NMR (376 MHz, Toluene-d$_8$) δ −126.98-−127.43 (m, 6F), −151.95 (t, J=19.4 Hz, 3F), −158.78 (d, J=21.6 Hz, 2F), −159.89-−160.72 (m, 6F), −163.53 (td, J=21.0, 3.4 Hz, 2F), −164.46 (tt, J=22.2, 4.2 Hz, 1F). $^{13}$C NMR (101 MHz, Toluene-d$_8$) δ 151.61-150.20 (m), 149.26-147.93 (m), 143.23-142.35 (m), 142.27-141.74 (m), 138.80-137.65 (m), 136.00-135.01 (m). $^{27}$Al NMR (104 MHz, Toluene-d$_8$) δ 120.11 (br). HRMS (ESI) Calculated for C$_{24}$AlF$_{20}$O [M$^−$] 710.9451; found 710.9426.

Example 7: Synthesis of Activator 2

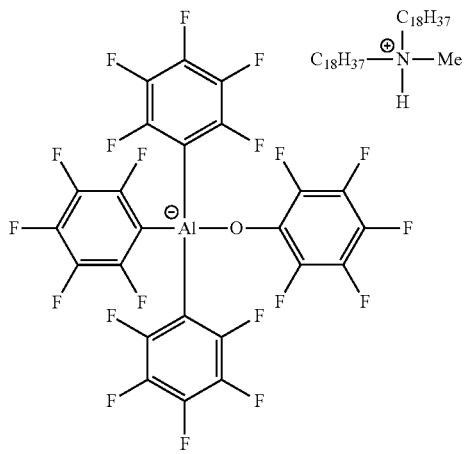

In a nitrogen-filled glovebox, Armeenium M2HT chloride (118.2 mg, 0.207 mmol, 1 equiv.), lithium (perfluorophenoxy)tris(perfluorophenyl)aluminate (167.3 mg, calculated to be 0.207 mmol including 1 equiv. of toluene, 1 equiv.) and toluene (5 mL) were stirred at room temperature for 1 h. A slightly hazy solution was obtained. The solution was passed through a 0.45 μm syringe filter in line with a 0.2 μm syringe filter. The filter was washed twice with 1 mL toluene, and the combined filtrates were concentrated in vacuo to afford a hazy white thick oil. The hazy white thick oil was dissolved in hexane (5 mL) to afford a hazy solution. The solution was passed through a 0.45 μm syringe filter in line with a 0.2 μm syringe filter, however the solution still remained hazy. All volatiles were removed in vacuo to afford 0.2065 g of a hazy white thick oil, a 80% yield.

$^1$H NMR (400 MHz, Toluene-$d_8$) δ 6.32 (s, 1H), 2.14 (dd, J=10.2, 6.2 Hz, 4H), 1.86 (s, 3H), 1.40-1.20 (m, 52H), 1.13 (h, J=8.4, 7.6 Hz, 8H), 0.99 (t, J=7.6 Hz, 4H), 0.91 (t, J=6.7 Hz, 6H). $^{19}$F NMR (376 MHz, Toluene-$d_8$) δ -122.34--122.82 (m, 6F), -156.12 (t, J=19.6 Hz, 3F), -161.69--162.06 (m, 2F), -163.08 (dq, J=19.6, 11.9 Hz, 6F), -167.22 (dd, J=22.6, 19.0 Hz, 2F), -174.36 (tt, J=22.8, 7.6 Hz, 1F). $^{13}$C NMR (101 MHz, Toluene-$d_8$) δ 152.65-150.61 (m), 149.88-148.24 (m), 143.02-141.27 (m), 139.90-138.71 (m), 138.61-137.42 (m), 135.72-134.53 (m), 56.45, 39.57, 32.01, 29.89, 29.87, 29.84, 29.82, 29.77, 29.61, 29.51, 29.42, 29.01, 26.17, 23.93, 22.76, 13.91. $^{27}$Al NMR (104 MHz, Toluene-$d_8$) δ 113.16. HRMS (ESI) Calculated for $C_{37}H_{78}N$ [M$^+$] 536.6129; found 536.6123. Calculated for $C_{24}AlF_{20}O$ [M$^-$] 710.9451; found 710.9426.

Example 8: Synthesis of Activator 3 Precursor 1—Lithium 1,1,1,3,3,3-hexafluoro-2-(trifluoromethyl)propan-2-olate

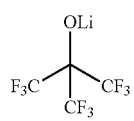

In a nitrogen-filled glovebox, a 100 mL round bottom flask is charged with a solution of 1.6 M n-BuLi in hexane (8.9 mL, 14.3 mmol, 1.05 equiv.) and pentane (100 mL). The vessel was sealed with a septum, removed the glovebox, attached to a nitrogen-filled Schlenk line, and cooled to 78° C. in a dry ice isopropanol bath. Perfluoro-tert-butanol (1.9 mL, 13.6 mmol, 1 equiv.) was added dropwise, resulting in the precipitation of a white solid. The cooling bath was removed and the reaction was allowed to warm to room temperature. The septum was tightly fastened and the reaction was transferred into the glovebox. The solution was cooled in a -30° C. freezer for 3 days. The solid was filtered, washed with cold (-30° C.) pentane, and dried in vacuo to afford the product as a white solid (2.92 g, 88% yield).

$^{19}$F NMR (376 MHz, THF-$d_8$) δ -75.51. $^{13}$C NMR (101 MHz, THF-$d_8$) δ 131.97 120.43 (m), 87.49-84.80 (m).

Example 9: Synthesis of Activator 3

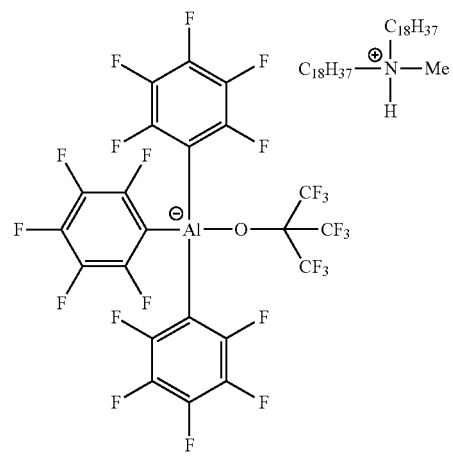

In a nitrogen-filled glovebox, tris(pentafluorophenyl)alane toluene adduct (see, Example 4) (200 mg, 0.348 mmol, 1 equiv.) and toluene (2 mL) was added to a reaction vial. The suspension was added to a solution of lithium perfluoro-tert-butoxide (75.8 mg, 0.314 mmol, 0.9 equiv.) and diethyl ether (4 mL). The tris(pentafluorophenyl)alane vial was washed three times with 1 mL of toluene, and solvent from the washes were added to the reaction. Upon addition of the alane and stirring, a slightly turbid, colorless solution was obtained. The reaction was stirred at room temperature for 22 h, yielding a slightly turbid, colorless solution. The solution was passed through a 0.45 μm syringe filter in line with a 0.2 μm syringe filter to afford a turbid colorless solution. The syringe filter was washed twice with 1 mL of diethyl ether. Upon addition of additional diethyl ether to the filtrate, a clear homogeneous solution was obtained. All volatiles were removed in vacuo. The residue was triturated with hexane (5 mL) and all volatiles were removed in vacuo (this process was repeated for a total of two times) to afford a thick, clear oil.

To the thick clear oil product was added Armeenium M2HT chloride (179.5 mg, 0.314 mmol, 0.9 equiv.) and toluene (5 mL). The reaction was stirred at room temperature for 18 h to yield a cloudy pale yellow solution. The solution was passed through a 0.45 μm syringe filter in line with a 0.2 μm syringe filter to afford a clear, pale yellow solution. The syringe filters were washed twice with 1 mL of toluene, and the combined filtrates were concentrated in vacuo to afford a clear, pale yellow oil. The residue was triturated with hexane (5 mL) and all volatiles were removed in vacuo (this process was repeated for a total of two times) to afford 0.4342 g of the product as a clear oil, a quantitative yield.

$^1$H NMR (400 MHz, Toluene-$d_8$) δ 3.65 (s, 1H), 2.20-2.09 (m, 4H), 1.95 (dq, J=11.9, 6.2, 5.4 Hz, 4H), 1.73 (d, J=5.1 Hz, 3H), 1.42-1.08 (m, 56H), 0.96-0.79 (m, 10H). $^{19}$F NMR (376 MHz, Toluene-$d_8$) δ −74.40 (s, 9F), −121.74--122.59 (m, 6F), −156.91 (t, J=19.6 Hz, 3F), −163.77 (ddd, J=30.9, 19.6, 12.1 Hz, 6F). $^{13}$C NMR (101 MHz, Toluene-$d_8$) δ 152.03-150.92 (m), 149.63-148.63 (m), 142.05-141.15 (m), 139.44-138.95 (m), 138.14-137.40 (m), 135.69-134.86 (m), 81.06-78.93 (m), 80.25, 79.95, 79.65, 79.34, 56.75, 39.88, 32.01, 29.87, 29.86, 29.85, 29.80, 29.72, 29.52, 29.50, 29.29, 28.83, 25.79, 23.82, 22.74, 13.90. $^{27}$Al NMR (104 MHz, Toluene-$d_8$) δ 101.74. HRMS (ESI) Calculated for $C_{37}H_{78}N$ [M$^+$] 536.6129; found 536.6129. Calculated for $C_{22}AlF_{24}O$ [M$^-$] 762.9387; found 762.9367.

Example 10—Polymerization Results

The polymerizations were carried out in a batch reactor according to the procedure previously described. Specifically, for the results summarized in Table 1-5, a 2 L batch reactor was heated to 170° C. The polymerization conditions included using 860 g of Isopar™ E, 70 grams of octene, and 210 psig of ethylene. The activator to procatalyst ratio was approximately 1.2; and 10 μmol of AlEt$_3$ was used as an impurity scavenger. The co-catalytic efficiency and resulting polymer characteristics were assessed for Activator 1, 2, and 3 having an anionic structure according to formula (I) and a bis-biphenylphenoxy Group IV metal-ligand catalyst. For the results summarized in Tables 6-7, a 2 L batch reactor was heated to 140° C. The polymerization conditions included using 605 g of Isopar™ E, 300 grams of octene, and 300 psig of ethylene. The activator to procatalyst ratio was approximately 1.2; and 50 equiv. (relative to procatalyst) of AlEt$_3$ was used as an impurity scavenger. The co-catalytic efficiency and resulting polymer characteristics were assessed for Activator 1-3, each having an anionic structure according to formula (I) and Group IV metal-ligand complex, specifically a constrained geometry procatalyst as shown in Table 6 or a bis-indenyl as shown in Table 7.

The metallic Activators 1, 2, and 3, and Comparative Activator C1 (herein "Comparative C1") were intermixed Procatalysts A-D to form a catalyst system. Comparative C1 had $^+$HN(Me)(C$_{18}$H$_{37}$)$_2$ as a countercation.

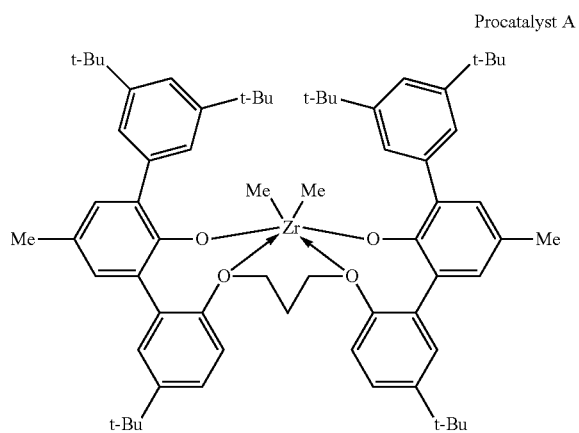

Procatalyst A

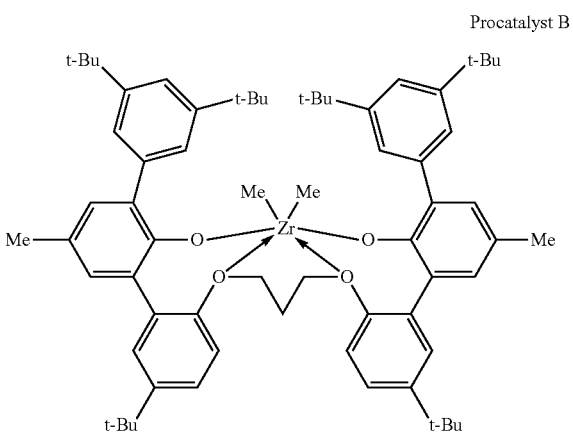

Procatalyst B

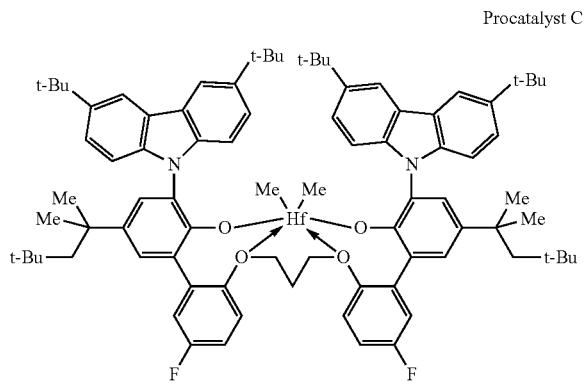

Procatalyst C

Procatalyst D

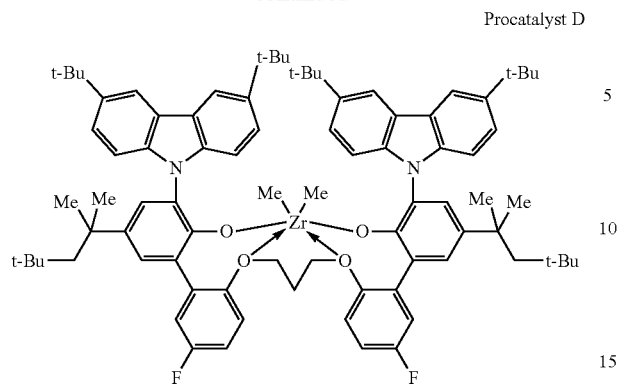

Procatalyst F

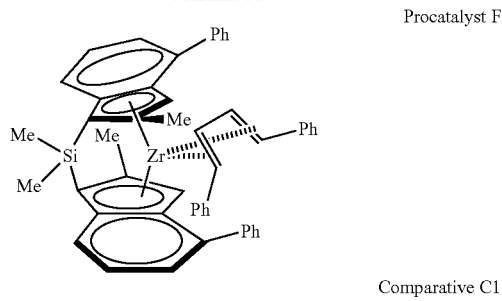

Procatalyst E

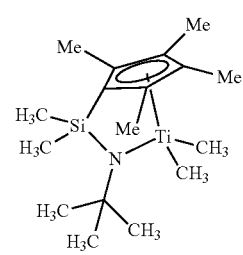

Comparative C1

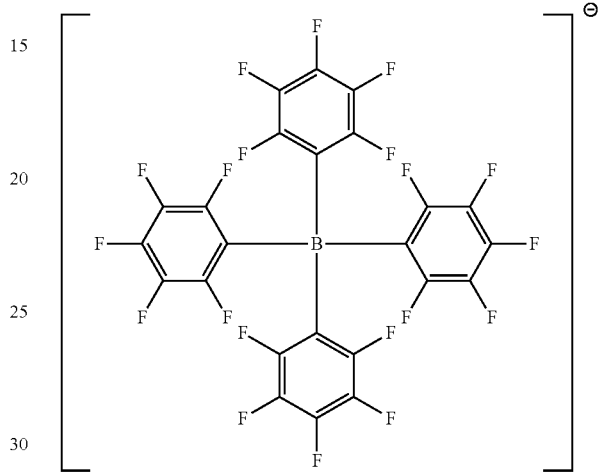

The efficiencies of the inventive Activators 1, 2, and 3, and Comparative Activator C1 (herein "Comparative C1") and the polymer characteristics of the polymers yielded from the inventive Activators 1, 2, and 3, and Comparative C1 were determined. The results are summarized in Tables 1-7. The Comparative C1 has been successfully used in industrial applications.

TABLE 1

Batch Reactor Results using 0.2 μmol Catalyst A

| Activator | Loading (μmol) | Yield (g) | Efficiency* | Mw | MWD | Mol % Octene |
|---|---|---|---|---|---|---|
| Comparative C1 | 0.24 | 20.7 | 1,134,570 | 362,430 | 2.23 | 5.8 |
| Comparative C1 | 0.24 | 22.0 | 1,205,823 | 350,081 | 2.29 | 6.8 |
| Activator 1 | 0.24 | 23.0 | 1,260,633 | 330,055 | 2.26 | 6.8 |
| Comparative C1 | 0.24 | 23.8 | 1,304,481 | 329,832 | 2.29 | 7.3 |

TABLE 2

Batch Reactor Results using 0.1 μmol Catalyst B

| Activator | Loading (μmol) | Yield (g) | Efficiency* | Mw | MWD | Mol % Octene |
|---|---|---|---|---|---|---|
| Comparative C1 | 0.24 | 24.1 | 2,641,849 | 236,173 | 4.65 | 8.7 |
| Activator 1 | 0.18 | 26.4 | 2,893,975 | 220,450 | 4.87 | 10.0 |
| Comparative C1 | 0.24 | 25.5 | 2,795,317 | 225,847 | 4.77 | 9.6 |

TABLE 3

Batch Reactor Results using 0.1 μmol Catalyst C

| Activator | Loading (μmol) | Yield (g) | Efficiency* | Mw | MWD | Mol % Octene |
|---|---|---|---|---|---|---|
| Comparative C1 | 0.24 | 42.2 | 2,364,278 | 288,698 | 2.35 | 15.4 |
| Activator 1 | 0.24 | 38.2 | 2,140,176 | 310,454 | 2.35 | 14.5 |
| Comparative C1 | 0.24 | 43.0 | 2,409,099 | 299,100 | 2.36 | 15.5 |

TABLE 4

Batch Reactor Results using 0.6 μmol Catalyst D

| Activator | Loading (μmol) | Yield (g) | Efficiency* | Mw | MWD | Mol % Octene |
|---|---|---|---|---|---|---|
| Comparative C1 | 0.72 | 11.7 | 213,760 | 808,844 | 2.30 | 8.8 |
| Activator 1 | 0.72 | 13.1 | 239,338 | 751,852 | 1.91 | 9.8 |
| Comparative C1 | 0.72 | 12.0 | 219,241 | 862,858 | 1.90 | 9.0 |

TABLE 5

Batch Reactor Results using 0.26 μmol Catalyst A

| Activator | Activator Loading (μmol) | Yield (g) | Efficiency* | Mw | MWD | Mol % Octene |
|---|---|---|---|---|---|---|
| Comparative C1 | 0.312 | 11.9 | 501,724 | 355,827 | 2.12 | 6.3 |
| Activator 2 | 0.312 | 11.9 | 501,724 | 345,340 | 2.09 | 6.2 |
| Activator 3 | 0.312 | 11.5 | 484,859 | 345,613 | 2.09 | 6.3 |

TABLE 6

Batch Reactor Results using 0.6 μmol Catalyst E

| Catalyst Loading (μmol) | Activator | Activator Loading (μmol) | Yield (g) | Efficiency* | Mw | MWD | Mol % Octene |
|---|---|---|---|---|---|---|---|
| 0.6 | Comparative C1 | 0.72 | 71.8 | 2,499,304 | 23,471 | 2.79 | 23.0 |
| 0.6 | Activator 1 | 0.72 | 56.8 | 1,977,165 | 25,448 | 2.73 | 23.0 |

TABLE 7

Batch Reactor Results using 1 μmol Catalyst F

| Catalyst Loading (μmol) | Activator | Activator Loading (μmol) | Yield (g) | Efficiency* | Mw | MWD | Mol % Octene |
|---|---|---|---|---|---|---|---|
| 1 | Comparative C1 | 1.2 | 71.2 | 780,496 | 29,520 | 3.29 | 26.8 |
| 1 | Activator 1 | 1.2 | 67.3 | 737,744 | 30,784 | 2.89 | 27.4 |

*Efficiency is defined in units of grams polymer per gram of active metal (Ti, Hf, or Zr).

TABLE 8

Results from Electrical Experiments Conducted with the Hydrocarbon Conductivity Test

| Activator | Dissipation Factor in solution, no water (60 Hz) | Dissipation Factor in solution, with water (60 Hz) |
|---|---|---|
| Comparative C1 | 0.28544 | 0.2828 |
| Activator 1 | 0.27343 | 0.06263 |

The Hydrocarbon Conductivity Test, as described in this disclosure, simulates the post-polymerization process when the produced polymer resins are washed with water to remove the catalyst and co-catalyst residue. The results summarized in Table 8 indicate that the Activator 1 has a better dissipation factor than $^-B(C_6F_5)_4$ anion present in Comparative C1.

Based on the results summarized in Table 8, it is believed that the water interacts in some way with the inventive Activators to reduce its contribution to the electrical properties. It is believed, without desiring to be bound by such belief, that the water chemically reacts with the activator resulting in a predominance of degradation products, and the degradation products do not significantly contribute to charge transport, and therefore, the polymers produced by the inventive activators exhibit low conductivity. However, it is believed that Comparative C1 does not react with water under the conditions of HC Test. Since Comparative C1 consists of ionic species, anions and cation, it contributes to ionic charge transport both before and after water addition.

As previously described, the hydrocarbon solution in the HC Test is heated to remove water. It is believed, without desiring to be bound by such belief, that the water, antioxidant, and/or heat of the process degrade the inventive activators resulting in a predominance of degradation products, which do not significantly contribute to charge transport. It is assumed that Comparative C1 does not significantly degrade under the conditions of the polymerization, and that being an ionic species it contributes to ionic charge transport in the elastomer.

TABLE 9

Thermal Gravimetric Analysis Results

| | Activator 1 |
|---|---|
| Onset (° C.) | 179 |

Table 9 contains the results obtained from a thermal gravimetric analysis curve. Activator 1 decomposes at a high temperature, 179° C. Therefore, Activator 1 is stable and can produce polymers at temperatures of 140° C. or greater as evidenced in Tables 1-4 and 6-7.

Equipment Standards

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Bruker Avance III HD 400 MHz NMR, Varian 400-MR or VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 μm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 μm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

The invention claimed is:

1. A process for polymerizing olefins, the process comprising contacting ethylene and a ($C_3$-$C_{40}$)alpha-olefin comonomer in the presence of a catalyst system in a solution polymerization reactor in an alkane solvent, the catalyst system comprising a procatalyst and a metallic activator ionic complex, the metallic activator comprising an anion and a countercation, the anion having a structure according to formula (I):

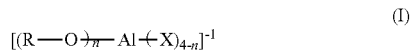

where:
n is 0 or 1;
each R is independently selected from the group consisting of radicals having formula (II) and radicals having formula (III):

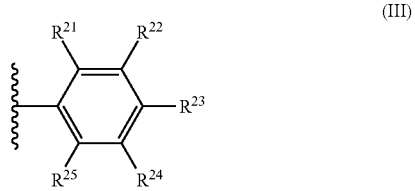

each Y is independently carbon or silicon;
each $R^{11}$, $R^{12}$, $R^{13}$, $R^{21}$, $R^{22}$, $R^{23}$, $R^{24}$, and $R^{25}$ is independently chosen from ($C_1$-$C_{40}$)alkyl, halogen-substituted ($C_1$-$C_{40}$)alkyl, ($C_6$-$C_{40}$)aryl, halogen-substituted ($C_6$-$C_{40}$)aryl, —OR$^C$, —SR$^C$, —H, —F or Cl, wherein at least one of $R^{11-13}$ and one of $R^{21-25}$ is a halogen-substituted ($C_1$-$C_{40}$)alkyl, a halogen-substituted ($C_6$-$C_{40}$)aryl, or —F; and
each X is a monodentate ligand independently chosen from halogen-substituted ($C_1$-$C_{20}$)alkyl or halogen-substituted ($C_6$-$C_{40}$)aryl;
optionally, two X groups in formula (I) are covalently connected;
each $R^C$ is independently halogen-substituted ($C_1$-$C_{30}$) hydrocarbyl; provided that
when the countercation is Me$_2$PhN(H)$^+$, and the anion is Al($C_6F_5$)$_4$, the procatalyst is not Ph$_2$C(Cp)(Flu)ZrCl$_2$ or Et(1-Ind)$_2$ZrCl$_2$; and
when the countercation is (Ph)$_3$C$^+$, and the anion is Al($C_6F_5$)$_4$, the procatalyst is not Et(1-Ind)$_2$ZrCl$_2$.

2. The process for polymerizing olefins according to claim 1, wherein the procatalyst is a bis-biphenylphenoxy Group IV metal-ligand complex.

3. The process for polymerizing olefins according to claim 1, wherein n is 0 and each X group is independently —C(H)(CF$_3$)$_2$, —C$_6$F$_5$, or —C(CF$_3$)$_3$.

4. The process for polymerizing olefins according to claim 1, wherein n is 1, and R is —C(CF$_3$)$_3$ and each X is —C$_6$F$_5$.

5. The process for polymerizing olefins according to claim 1, wherein n is 0, and three of the four X groups are —C$_6$F$_5$.

6. The process for polymerizing olefins according to claim 1, wherein n is 0, and all four X groups are —C$_6$F$_5$.

7. The process for polymerizing olefins according to claim 1, wherein the countercation is chosen from substituted ammonium, substituted and unsubstituted triarylcarbonium or substituted and unsubstituted ferrocenium.

8. The process for polymerizing olefins according to claim 1, wherein the countercation is $^+$N(H)R$^N_3$ where each R$^N$ is independently chosen from ($C_1$-$C_{30}$)alkyl or ($C_6$-$C_{20}$)aryl.

9. The process for polymerizing olefins according to claim 6, wherein the countercation is $^+N(H)^N_3$, where at least two $R^N$ are independently chosen from $(C_{10}\text{-}C_{30})$alkyl.

10. The process for polymerizing olefins according to claim 1, wherein the countercation is $^+C(C_6H_5)_3$.

11. The process for polymerizing olefins according to claim 1, wherein the countercation is $^+C(C_6H_4R^S)_3$, wherein $R^S$ is $(C_1\text{-}C_{20})$alkyl.

12. The process for polymerizing olefins according to claim 1, wherein n is 0.

13. The process for polymerizing olefins according to claim 1, wherein two X groups are covalently connected and the anion has a structure according to formula (IV):

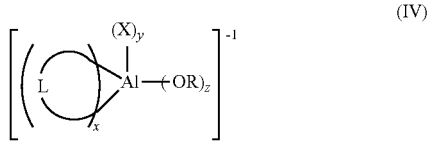

(IV)

where:
R and each X are as defined in formula (I);
z is 0 or 1; y is 0, 1, or 2; x is 1 or 2; and 2x+y+z=4;
L represents the two X groups that are covalently connected;
L is independently chosen from halogen-substituted $(C_2\text{-}C_{40})$alkylene, halogen substituted $(C_2\text{-}C_{40})$heteroalkylene, or halogen substituted $(C_6\text{-}C_{40})$arylene;
when z is 1, X is chosen from halogen, halogen-substituted $(C_1\text{-}C_{20})$alkyl, halogen-substituted $(C_6\text{-}C_{40})$aryl.

14. The process for polymerizing olefins according to claim 13, wherein L is a halogenated diradical biphenyl or halogenated diradical naphthalene-diyl.

15. The polymerization process according to claim 1, wherein the metallic activator ionic complex in a high boiling point fully saturated hydrocarbon solution having a concentration of 200 micromoles of metallic activator ionic complex and 20 millimoles of water per liter of the high boiling point fully saturated hydrocarbon solution has a percent dissipation factor of less than or equal to 0.1 at a as measured by the Hydrocarbon Conductivity Test.

* * * * *